(12) United States Patent
Nakamura

(10) Patent No.: US 7,462,726 B2
(45) Date of Patent: Dec. 9, 2008

(54) CONJUGATED THIOPHENE COMPOUND COMPRISING PERFLUORINATED AND ALKYLATED SIDECHAINS, CONDUCTIVE ORGANIC THIN FILM CONTAINING THE COMPOUND, AND FIELD-EFFECT TYPE ORGANIC TRANSISTOR EMPLOYING THE THIN FILM

(75) Inventor: Shinichi Nakamura, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 10/566,166

(22) PCT Filed: Jan. 26, 2005

(86) PCT No.: PCT/JP2005/001438

§ 371 (c)(1),
(2), (4) Date: Jan. 27, 2006

(87) PCT Pub. No.: WO2005/070992

PCT Pub. Date: Aug. 4, 2005

(65) Prior Publication Data

US 2006/0234335 A1    Oct. 19, 2006

(30) Foreign Application Priority Data

Jan. 27, 2004  (JP) ............................. 2004-018357

(51) Int. Cl.
*C07D 409/14* (2006.01)
(52) U.S. Cl. ...................................................... 549/59
(58) Field of Classification Search .................. 549/59
See application file for complete search history.

(56) References Cited

U.S. PATENT DOCUMENTS 6,124,475 A * 9/2000 Chmil et al. .................. 549/59

6,692,658 B2   2/2004 Nakamura et al. ...... 252/299.65

(Continued)

FOREIGN PATENT DOCUMENTS

EP       1 279 689        1/2003

(Continued)

OTHER PUBLICATIONS

X. M. Hong, et al., "Controlling the Macromolecular Architecture of Poly(3-alkylthiophene)s by Alternating Alkyl and Fluoralkyl Substituents", Macromolecules, vol. 33, No. 10, 2000, pp. 3502-3504.

(Continued)

*Primary Examiner*—Kamal A Saeed
*Assistant Examiner*—Shawquia Young
(74) *Attorney, Agent, or Firm*—Fitzpatrick, Cella, Harper & Scinto

(57) ABSTRACT

A π-conjugated compound has rings represented by Formulae (I) and (II), an odd number of rings being interposed between the rings of Formula (I), and an odd number of rings being interposed between the rings of Formula (II):

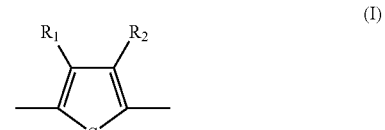

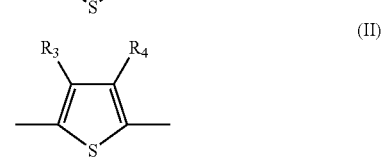

where $R_1$ and $R_2$ are hydrogen or a substituted or unsubstituted linear, cyclic, or branched alkyl group of 1 to 20 carbon atoms, at least one of $R_1$ and $R_2$ being not hydrogen; and $R_3$ and $R_4$ are hydrogen or a substituted or unsubstituted linear, cyclic, or branched perfluoroalkyl group of 1 to 20 carbon atoms.

4 Claims, 3 Drawing Sheets

U.S. PATENT DOCUMENTS

| | | | |
|---|---|---|---|
| 6,770,904 | B2 | 8/2004 | Ong et al. ..................... 257/40 |
| 6,872,801 | B2 | 3/2005 | Ong et al. ................... 528/373 |
| 6,875,996 | B2 | 4/2005 | Nakamura ................... 257/40 |
| 6,936,186 | B2 | 8/2005 | Igawa et al. ............ 252/299.01 |
| 6,949,762 | B2 | 9/2005 | Ong et al. ..................... 257/40 |
| 7,141,644 | B2 | 11/2006 | Ong et al. ................... 528/373 |
| 2007/0034860 | A1 | 2/2007 | Nakamura ................... 257/40 |
| 2007/0034861 | A1 | 2/2007 | Nakamura ................... 257/40 |

FOREIGN PATENT DOCUMENTS

| | | |
|---|---|---|
| EP | 1 329 474 | 7/2003 |
| JP | 2003-221434 | 8/2003 |
| JP | 2003-261655 | 9/2003 |
| JP | 2003-268083 | 9/2003 |
| JP | 2003-292588 | 10/2003 |

OTHER PUBLICATIONS

R. L. Pilston, et al. "Toward highly fluorescent polythiophenes: head-to-tail coupled copolymers of 3-(methoxyethoxyethoxymethyl) thiophene and 3-(perfluoroalkyl) thiophene", Synthetic Metals, vol. 111-112, 2000, pp. 433-436.

Anna Bravo, et al., "New Methods of Free-Radical Perfluoroalkylation of Aromatics and Alkenes. Absolute Rate Constants and Partial Rate Factors for the Homolytic Aromatic Substitution by $n$-Perfluorobutyl Radical", Journal of Organic Chemistry, vol. 62, No. 21, 1997, pp. 7128-7136.

Tian-An Chen, et al., "Regiocontrolled Synthesis of Poly(3-alkylthiophenes) Mediated by Rieke Zinc: Their Characterization and Solid-State Properties", Journal of the American Chemical Society, vol. 117, No. 1, 1995, pp. 233-244 with Supplemental pp. 1-14.

Richard M. Kellogg, et al., "Acid-Catalyzed Brominations, Deuterations, Rearrangements, and Debrominations of Thiophenes under Mild Conditions", The Journal of Organic Chemistry, vol. 33, No. 7, Jul. 1968, pp. 2902-2909.

J. Leroy, et al., "Copper-Mediated Perfluoroalkylation of Halogenothiophenes", Journal of Fluorine Chemistry, vol. 27, No. 3, 1985, pp. 291-298.

Tsuyoshi Okamoto, et al., "Halogenation Using Quaternary Ammonium Polyhalides. XXXI Halogenation of Thiophene Derivatives with Benzyltrimethylammonium Polyhalides", Bulletin of the Chemical Society of Japan, vol. 64, No. 8, 1991, pp. 2566-2568.

H. Sirringhaus, et al., "Two-dimensional charge transport in self-organized, high-mobility conjugated polymers", Nature, vol. 401, Oct. 14, 1999, pp. 685-688.

K. Tamao, et al., "Nickel-Phosphine Complex-Catalyzed Grignard Coupling-II", Tetrahedron, vol. 38, No. 22, 1982, pp. 3347 to 3354.

Chenggang Wang, et al., "Studies on Conjugated Polymers: Preparation, Spectroscopic, and Charge-Transport Properties of a New Soluble Polythiophene Derivative: Poly (3',4'-dibutyl-2,2':5'2"-terthiophene)", Chem. Mater., vol. 6, No. 4, 1994, pp. 401-411.

\* cited by examiner

CONJUGATED THIOPHENE COMPOUND COMPRISING PERFLUORINATED AND ALKYLATED SIDECHAINS, CONDUCTIVE ORGANIC THIN FILM CONTAINING THE COMPOUND, AND FIELD-EFFECT TYPE ORGANIC TRANSISTOR EMPLOYING THE THIN FILM

This application claims priority from Japanese Patent Application No. 2004-018357 filed on Jan. 27, 2004, which is hereby incorporated by reference herein.

TECHNICAL FIELD

The present invention relates to a π-conjugated compound, a conductive organic thin film containing the π-conjugated compound, and a field effect type organic transistor, which are useful in electronic field such as display devices, information tags, and ICs.

BACKGROUND ART

The organic transistor employing an organic semiconductor can be formed on a plastic substrate and enables enlargement of a screen, which cannot readily be achieved by a silicon transistor. In particular, the organic transistor employing a soluble organic semiconductor can be produced at a lower cost without employing a vacuum process, and is promising for application to new devices such as flexible electronic paper sheets and information tags.

A π-conjugated compound and a device employing the π-conjugated compound are disclosed in Japanese Patent Application Laid-Open Nos. 2003-221434, 2003-261655, 2003-268083, and 2003-292588.

DISCLOSURE OF THE INVENTION

The aforementioned soluble organic semiconductors typified by polymers have disadvantages: (1) a low mobility, (2) a low on-off ratio, (3) a high threshold, (4) less kinds of n-type semiconductors, (5) low stability, and so forth. Some improvement regarding the item (4) of the above disadvantage has been made, but is not sufficient. The present invention has been made to overcome the disadvantages of the prior art techniques. The present invention provides a π-conjugated compound, a conductive organic thin film containing the π-conjugated compound, and a field-effect type organic transistor and an electronic device employing this thin film to solve the above problem.

According to an aspect of the present invention, there is provided a π-conjugated compound which has two or more rings represented by Formula (I) and two or more rings represented by Formula (II), an odd number of rings being interposed between the rings of Formula (I), and an odd number of rings being interposed between the rings of Formula (II):

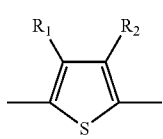
(I)

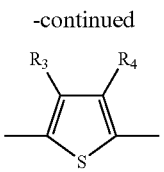
(II)

where $R_1$ and $R_2$ are respectively hydrogen or a linear, cyclic, or branched alkyl group of 1 to 20 carbon atoms, at least one of $R_1$ and $R_2$ being not hydrogen, and $CH_2$ of the alkyl group may be replaced by O, CO, S, or NH; and $R_3$ and $R_4$ are respectively hydrogen or a linear, cyclic, or branched perfluoroalkyl group of 1 to 20 carbon atoms, at least one of $R_3$ and $R_4$ being not hydrogen, and one or more of $CF_2$ of the perfluoroalkyl group may be replaced by $CH_2$, O, CO, S, or NH.

According to another aspect of the present invention, there is provided a π-conjugated compound represented by any of General Formulas (III) to (VII) below;

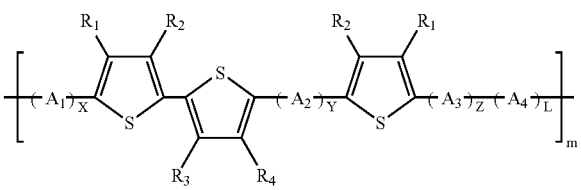
(III)

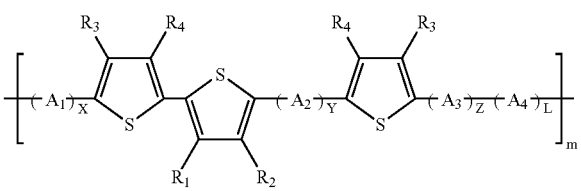
(IV)

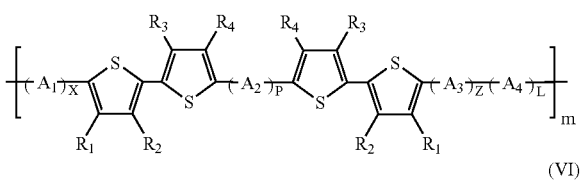
(V)

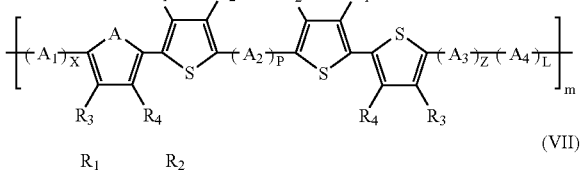
(VI)

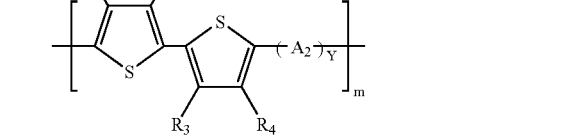
(VII)

where $R_1$ and $R_2$ are respectively hydrogen or a linear, cyclic, or branched alkyl group of 1 to 20 carbon atoms, at least one of $R_1$ and $R_2$ being not hydrogen, and one or more of $CH_2$ of the alkyl group may be replaced by O, CO, S, or NH; $R_3$ and $R_4$ are respectively hydrogen or a linear, cyclic, or branched perfluoroalkyl group of 1 to 20 carbon atoms, at least one of $R_3$ and $R_4$ being not hydrogen, and one or more of $CF_2$ of the perfluoroalkyl group may be replaced by $CH_2$, O, CO, S, or NH; $A_1$, $A_2$, $A_3$, and $A_4$ represent respectively a linkage selected independently from the group consisting of a single bond, an alkylene group of 1 to 10 carbon atoms, a —(CH=CH)$_r$— group, and bivalent ring groups of thiophene, furan, benzene, anthracene, and pentacene; one or more of CH groups in the ring may be replaced by N, or may have a substituent; r is an integer of 1 to 10; X, Z, and L are respectively an integer of 0 to 20 provided that the sum X+Z+L is an odd number; Y is an even number of not more than 20; P is an odd number not more than 19; and m is an integer of 2 or more.

According to still another aspect of the present invention, there is provided a π-conjugated compound represented by any of General Formulas (IIIa) to (VIIIa) below;

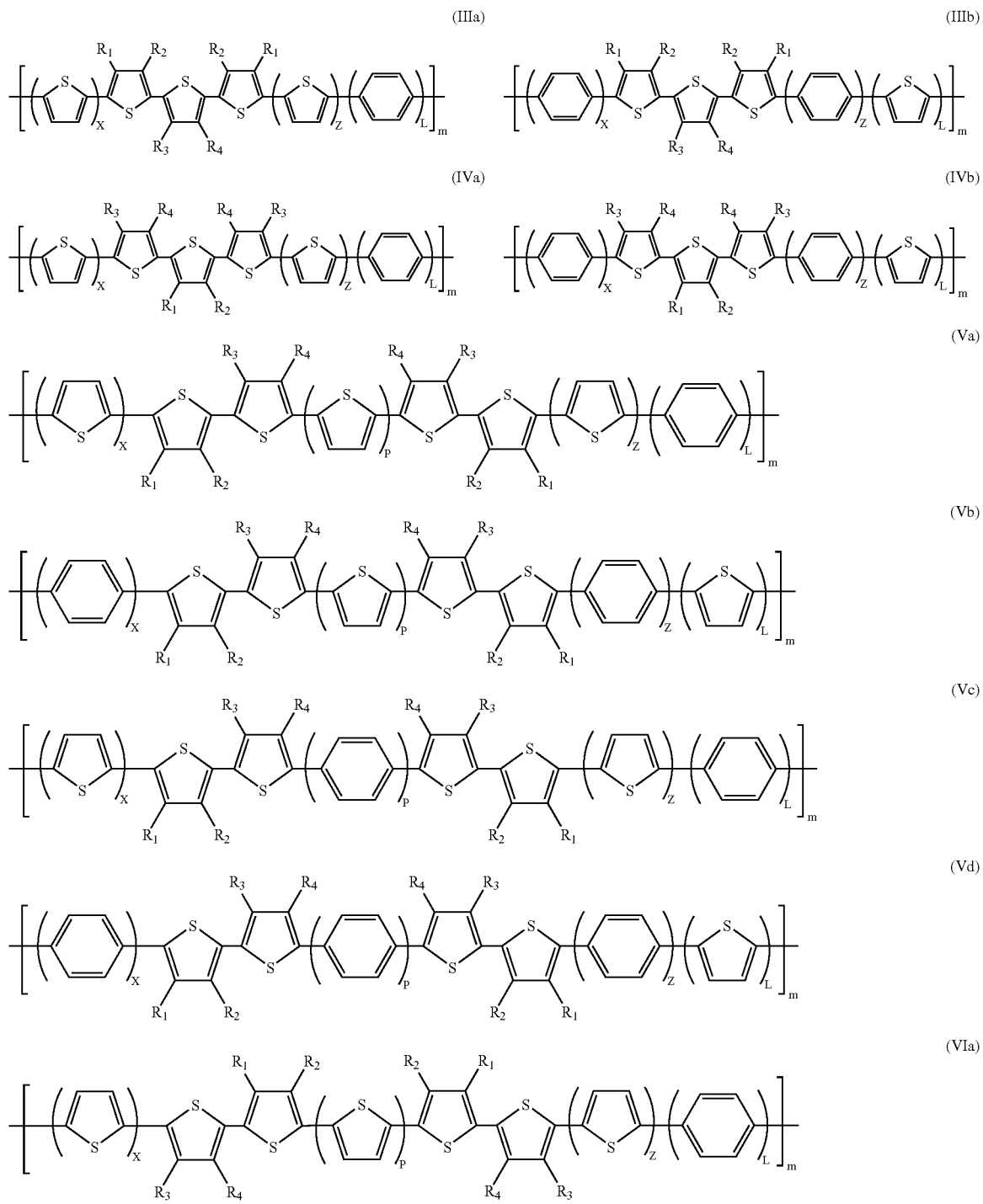

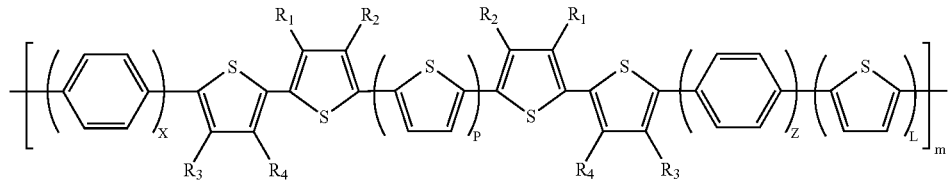

(VIb)

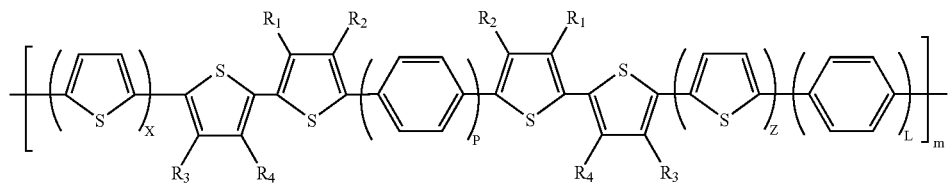

(VIc)

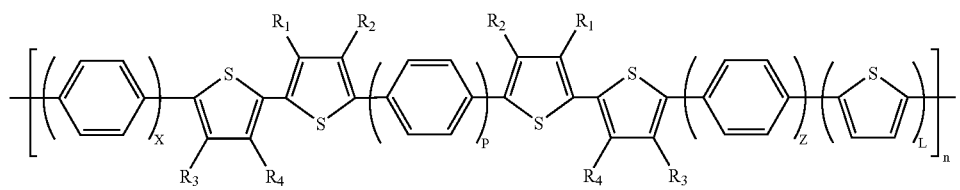

(VId)

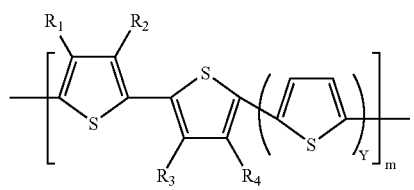

(VIIa)

where $R_1$ and $R_2$ are respectively hydrogen or a linear, cyclic, or branched alkyl group of 1 to 20 carbon atoms, at least one of $R_1$ and $R_2$ being not hydrogen, and one or more of $CH_2$ of the alkyl group may be replaced by O, CO, S, or NH; $R_3$ and $R_4$ are respectively hydrogen or a linear, cyclic, or branched perfluoroalkyl group of 1 to 20 carbon atoms, at least one of $R_1$ and $R_2$ being not hydrogen, and one or more of $CF_2$ of the perfluoroalkyl group may be replaced by $CH_2$, O, CO, S, or NH; X, Z, and L are respectively an integer of 0 to 20 provided that the sum X+Z+L is an odd number; Y is an even number of not more than 20; P is an odd number not more than 19; and m is an integer of 2 or more.

In the π-conjugated compounds of the present invention, X, Z, and L are respectively an integer of 0 to 6, Y is an even number of 6 or less, and P is an odd number of 5 or less, preferably.

Alternatively, in the π-conjugated compound of the present invention, m is preferably an integer of 2 to 500.

According to a further aspect of the present invention, there is provided a conductive organic thin film containing the π-conjugated compound of the present invention.

According to a further aspect of the present invention, there is provided a conductive organic thin film, containing an organic compound, wherein the organic compound has, in the molecule, group or skeleton moieties capable of causing at least three kinds of intermolecular interactions, and the conductive organic thin film is constructed to have an ordered structure by alignment of the group or skeleton moieties between the molecules.

In the conductive organic thin film of the present invention, the intermolecular interactions preferably includes a π-π interaction, an alkyl interaction, and a perfluoroalkyl interaction. Further, the organic compound is preferably aligned in the film in the conductive organic thin film.

According to a further aspect of the present invention, there is provided a field effect type organic transistor, constituted of three electrodes of a source electrode, a drain electrode, and a gate electrode, a gate insulating layer, and an organic semiconductor layer, wherein the organic semiconductor layer is a conductive organic thin film of the present invention.

In the field effect type organic transistor of the present invention, molecules of the π-conjugated compound have respectively a long molecular axis aligned parallel to the direction of the source electrode and the drain electrode, preferably.

Alternatively, in the field effect type organic transistor of the present invention, molecules of the π-conjugated compound have respectively a long molecular axes aligned perpendicularly to the direction of the source electrode and the drain electrode, preferably.

The present invention provides a π-conjugated compound and a conductive organic thin film containing the compound which are useful in electronic application fields such as display device, information tags, and ICs. The present invention provides also a field effect type organic transistor which achieves a high mobility, a high on-off ratio, and high durability against external stimulation.

The present invention is explained below in more detail by reference to examples without limiting the invention in any way.

BEST MODE FOR CARRYING OUT THE INVENTION

Figure 1:
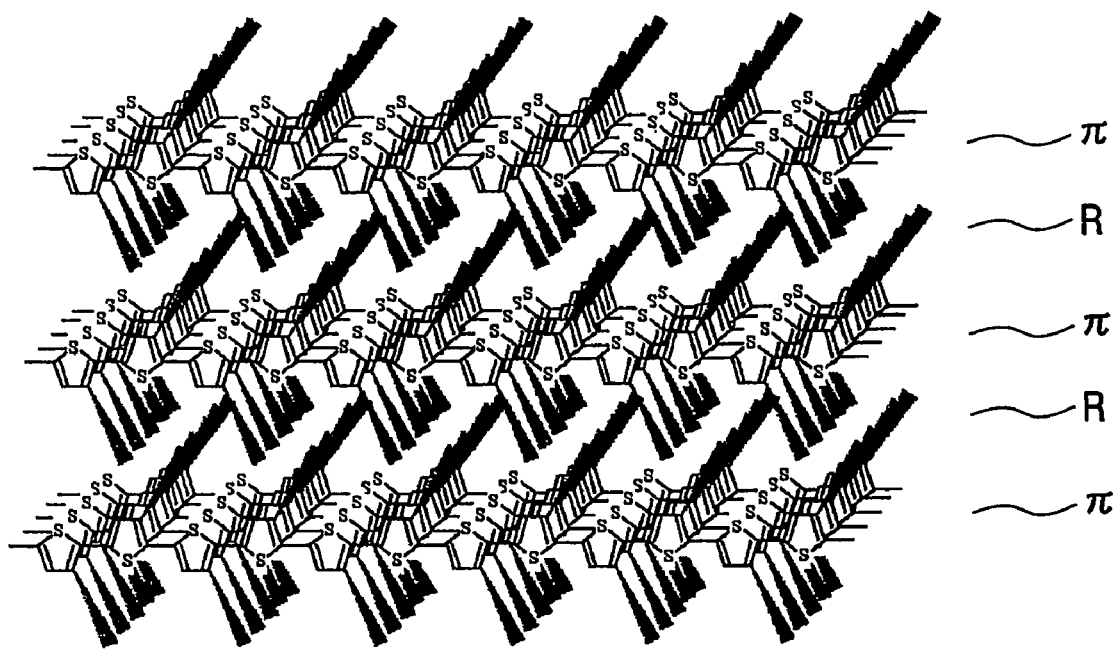
FIG. 1 illustrates schematically of a lamella stack structure of the π-conjugated compound.
Figure 2:
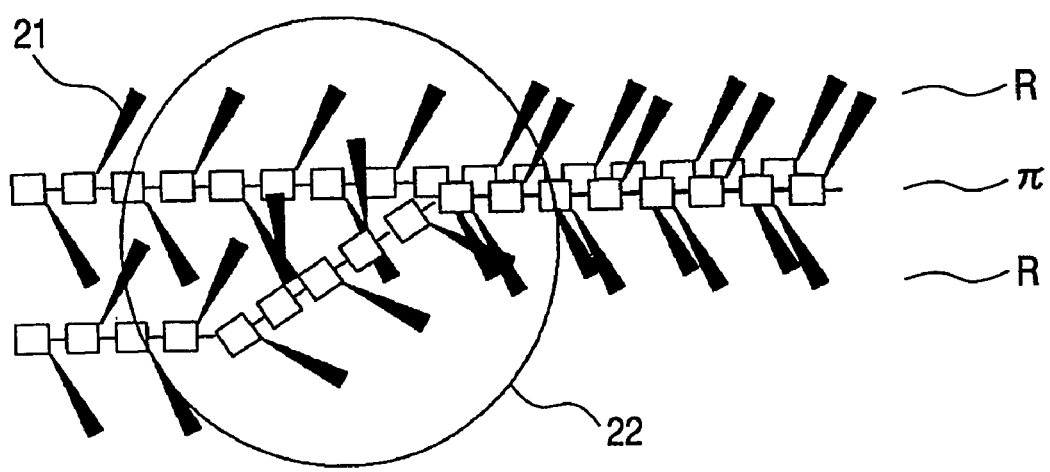
FIG. 2 illustrates schematically a defect portion of the lamella stack structure.
Figure 3:
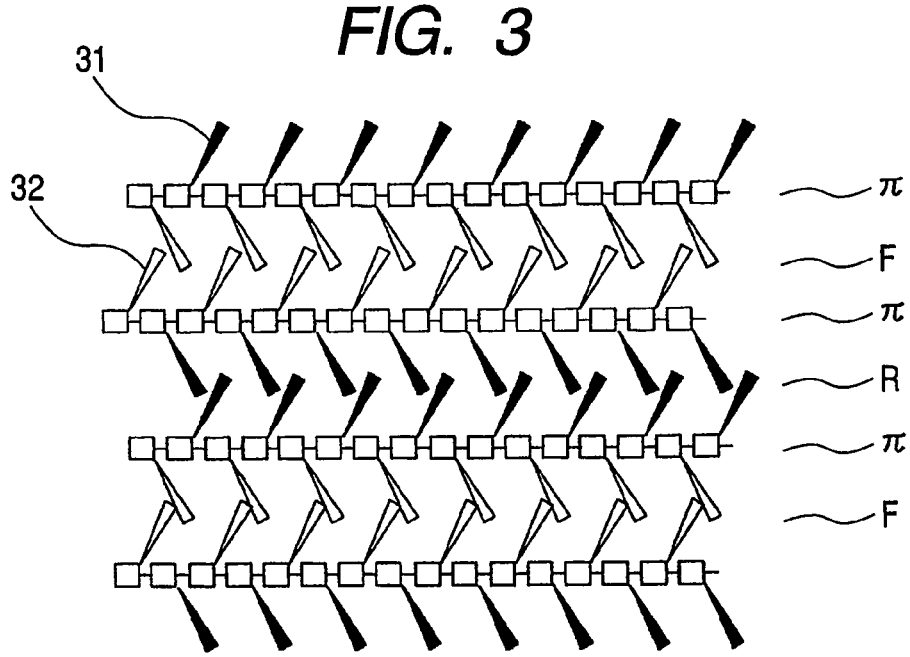
FIG. 3 illustrates schematically a conductive organic thin film of the present invention.

The process of investigation for designing the π-conjugated compound of the present invention is explained below. The conductive organic thin film of the present invention has an ordered structure constructed by at least three kinds of intermolecular interactions. Conductive organic thin films are explained in detail by reference to FIGS. 1, 2, and 3. FIG. 1 illustrates schematically a lamella stack structure of a π-conjugated compound. A conductive organic thin film formed typically from poly(3-hexylpolythiophene) is known to have the lamella stack structure shown in FIG. 1. This stack structure is suggested to contribute charge transport by a literature: Nature, 401, 685, 1999. This lamella stack structure is constructed by two kinds of intermolecular interactions: a π-π interaction between thiophene rings, and an alkyl interaction between alkyl side chains, which are denoted by "π" and "R" respectively in FIGS. 1 to 3. FIG. 2 illustrates schematically a defect portion of the lamella stack structure. As shown in FIG. 2, owing to no more than two kinds of interactions, the alkyl interaction can coexist between the lamella layers, which tends to cause the defect 22. FIG. 3 illustrates schematically a conductive organic thin film of the present invention. As shown in FIG. 3, the interactions between the molecules are made stronger by utilizing three kinds of interactions, and thereby the distance between the interactions are increased in the lamella layer direction, making less liable the formation of defects between lamella layers. Therefore, the conductive organic thin film of the present invention has a structure for high charge transportability. The intermolecular interactions preferably include a π-π interaction, an alkyl interaction, and a perfluoroalkyl interaction, which is denoted by "F" in FIG. 3. The π-conjugated compound of the present invention is molecular-designed based on the above idea. The structure of the π-conjugated compound is made to have a skeleton exerting effectively the π-π interaction, the alkyl interaction and the perfluoroalkyl interaction.

Hitherto, π-conjugated compounds are known which have an alkyl side chain or a perfluoroalkyl side chain. However, the known π-conjugated compounds have a random structure, being not controlled in structure for the effective alkyl interaction and perfluoroalkyl interaction.

Figure 4A:
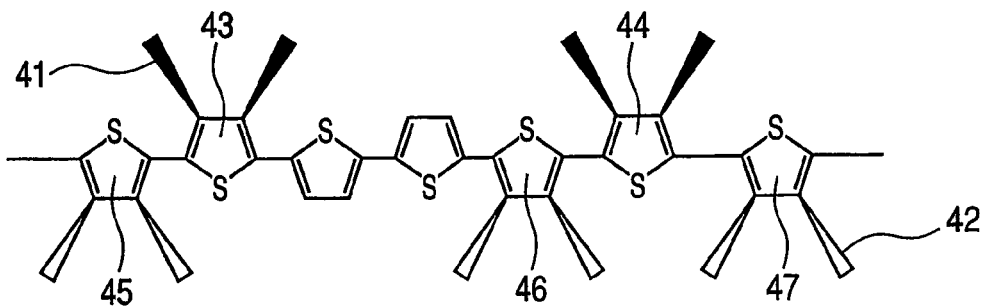
FIG. 4A shows a part of a π-conjugated compound of the present invention.
Figure 4B:
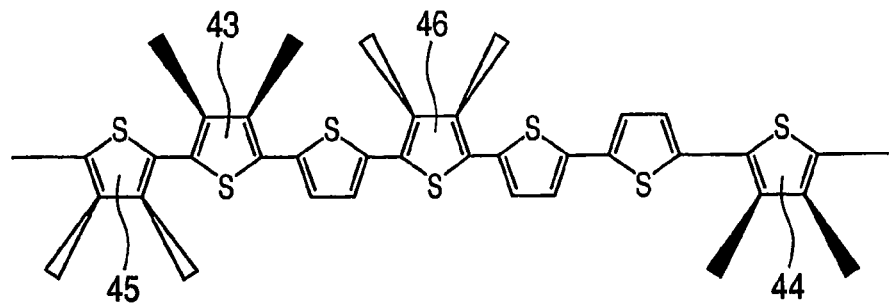
FIG. 4B shows a part of a π-conjugated compound which is not included in the compounds of the present invention.

The control of the structure is explained by reference to FIGS. 4A and 4B. FIG. 4A illustrates schematically a part of a π-conjugated compound of the present invention. The numeral 41 denotes an alkyl side chain. The numeral 42 denotes a perfluoroalkyl side chain. The numerals 43 to 47 denote respectively a thiophene ring. The adjacent thiophene rings are reversed alternately by 180° owing to the interaction between the S atoms of the adjacent rings. Therefore, for example, the alkyl side chains of the thiophene rings 43 and 44 take the same side only when the odd number of thiophene rings exist between the thiophene ring 43 and the thiophene ring 44. Similarly, the perfluoroalkyl side chains of the thiophene rings 45, 46, and 47 take the same side only when the odd number of thiophene rings exist between the thiophene rings having the perfluoroalkyl side chain. With an even number of the rings between the rings having the same kind of the side chains as shown in FIG. 4B, the side chains take opposite side, not giving the intended interaction. The π-conjugated compound of the present invention is accomplished on the basis of the above consideration.

The π-conjugated compound of the present invention has ring groups shown by the structural formulas (I) and (II), respectively two or more, in which an odd number of the rings exist between the two rings represented by the structural formula (I), and an odd number of the rings exist between the two rings represented by the structural formula (II).

The present invention provides the π-conjugated compound represented by any of the aforementioned General Formulas (III) to (VII).

Further the present invention provides the π-conjugated compound represented by any of General Formulas (IIIa) to (VIIa).

The rings having no side chain are limited in view of the solubility. Therefore, the symbols X, Z, and L are respectively an integer ranging from 0 to 6; Y being preferably an even number not more than 6 and P being preferably an even number of not more than 5; and m is preferably an integer ranging from 2 to 500.

Specific examples of the compounds are shown in Tables 1 to 5, but the compounds are not limited thereto. The symbols used in the Tables denote the groups as shown below.

Cn:

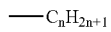

Fr:

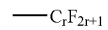

CnFr:

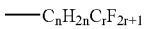

OCn:

OCnFr:

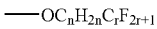

Th:

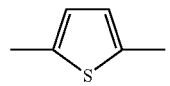

Fu:
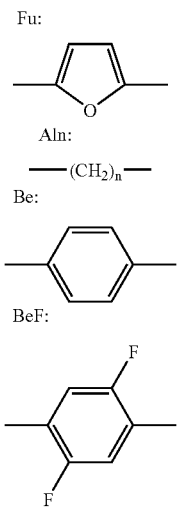
Aln:
Be:
BeF:

Pe:
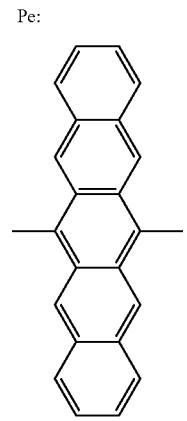

TABLE 1

| No. | General Formula | R1 | R2 | R3 | R4 | A1 | A2 | A3 | A4 | X | Y | Z | L |
|---|---|---|---|---|---|---|---|---|---|---|---|---|---|
| III-1 | III | C2 | H | F3 | F3 | Th | — | Th | Th | 1 | 0 | 1 | 1 |
| III-2 | III | C3 | H | F6 | F6 | Th | — | Th | Th | 1 | 0 | 1 | 1 |
| III-3 | III | C4 | H | F10 | F10 | Th | — | Th | Th | 1 | 0 | 1 | 1 |
| III-4 | III | C5 | H | F6 | F6 | Th | — | Th | Th | 1 | 0 | 1 | 1 |
| III-5 | III | C6 | H | F6 | F6 | Th | — | Th | Th | 1 | 0 | 1 | 1 |
| III-6 | III | C7 | H | F6 | F6 | — | — | — | Th | 0 | 0 | 0 | 1 |
| III-7 | III | C8 | H | F6 | F6 | Th | — | Th | Th | 2 | 0 | 2 | 1 |
| III-8 | III | H | C6 | F6 | F6 | Th | — | Th | Th | 1 | 0 | 1 | 1 |
| III-9 | III | H | C7 | C6F3 | C6F3 | Th | — | Th | Th | 1 | 0 | 1 | 1 |
| III-10 | III | H | C8 | F9 | H | Th | — | Th | Be | 1 | 0 | 1 | 1 |
| III-11 | III | H | C9 | F12 | F12 | Th | — | Th | Be | 1 | 0 | 1 | 1 |
| III-12 | III | H | C10 | F12 | F12 | Th | — | Th | Be | 1 | 0 | 1 | 5 |
| III-13 | III | C6 | C6 | F6 | F6 | — | — | — | Be | 0 | 0 | 0 | 3 |
| III-14 | III | C7 | C7 | F7 | F7 | Th | — | Th | Be | 2 | 0 | 2 | 1 |
| III-15 | III | C8 | C8 | F8 | F8 | Th | — | Th | Be | 1 | 0 | 1 | 1 |
| III-16 | III | C2 | H | C6F4 | C6F4 | Be | — | Be | Th | 1 | 0 | 1 | 3 |
| III-17 | III | C3 | H | F6 | F6 | Be | — | Be | Th | 1 | 0 | 1 | 1 |
| III-18 | III | C4 | H | F10 | F10 | Be | — | Be | Th | 1 | 0 | 1 | 1 |
| III-19 | III | C5 | H | F6 | F6 | Be | — | Be | Th | 1 | 0 | 1 | 1 |
| III-20 | III | C6 | H | F6 | H | Be | — | Be | Th | 1 | 0 | 1 | 1 |
| III-21 | III | C7 | H | F6 | F6 | Be | — | Be | Th | 3 | 0 | 3 | 1 |
| III-22 | III | C8 | H | F6 | F6 | Be | — | Be | Th | 1 | 0 | 1 | 1 |
| III-23 | III | H | C6 | C6F4 | C6F4 | Be | — | Be | Th | 1 | 0 | 1 | 1 |
| III-24 | III | H | C7 | F8 | F8 | Be | — | Be | Th | 1 | 0 | 1 | 1 |
| III-25 | III | H | C8 | F9 | F9 | Be | — | Be | Be | 1 | 0 | 1 | 1 |
| III-26 | III | H | C9 | F12 | F12 | Be | — | Be | Be | 1 | 0 | 1 | 1 |
| III-27 | III | H | C10 | F12 | F12 | Be | — | Be | Be | 1 | 0 | 1 | 3 |
| III-28 | III | C6 | C6 | F6 | F6 | Be | — | Be | Be | 1 | 0 | 1 | 1 |
| III-29 | III | C7 | C7 | F7 | H | Be | — | Be | Be | 4 | 0 | 4 | 1 |
| III-30 | III | C8 | C8 | F8 | F8 | Be | — | Be | Be | 1 | 0 | 1 | 1 |
| III-31 | III | C6 | C6 | F6 | F6 | Th | Th | Th | Th | 1 | 2 | 1 | 1 |
| III-32 | III | C6 | C6 | F6 | F6 | Th | — | Th | Fu | 1 | 0 | 1 | 1 |
| III-33 | III | C6 | C6 | F6 | F6 | Th | — | Th | BeF | 1 | 0 | 1 | 1 |
| III-34 | III | C6 | C6 | F6 | F6 | Th | — | Th | An | 1 | 0 | 1 | 1 |
| III-35 | III | C6 | C6 | C6F4 | C6F4 | Th | — | Th | Th | 1 | 0 | 1 | 1 |
| III-36 | III | H | C6 | F6 | F6 | Th | — | Th | Th | 1 | 0 | 1 | 18 |
| III-37 | III | OC6 | H | F6 | H | Th | — | Th | Th | 1 | 0 | 1 | 3 |
| III-38 | III | H | C6 | H | OC2F6 | Th | — | Th | Th | 1 | 0 | 1 | 1 |

TABLE 2

| No. | General Formula | R1 | R2 | R3 | R4 | A1 | A2 | A3 | A4 | X | Y | Z | L |
|---|---|---|---|---|---|---|---|---|---|---|---|---|---|
| IV-1 | IV | C2 | C2 | F3 | H | Th | — | Th | Th | 1 | 0 | 1 | 1 |
| IV-2 | IV | C3 | C3 | F6 | H | Th | — | Th | Th | 1 | 0 | 1 | 1 |
| IV-3 | IV | C4 | C4 | F10 | H | — | — | — | Th | 0 | 0 | 0 | 3 |
| IV-4 | IV | C5 | C5 | F6 | H | Th | — | Th | Th | 1 | 0 | 1 | 1 |
| IV-5 | IV | C6 | C6 | H | F3 | Th | — | Th | Th | 1 | 0 | 1 | 1 |
| IV-6 | IV | C6 | C6 | F5 | H | Th | — | Th | Th | 1 | 0 | 1 | 1 |
| IV-7 | IV | C6 | C6 | F6 | H | Th | — | Th | Th | 1 | 0 | 1 | 1 |
| IV-8 | IV | C6 | C6 | F8 | H | Th | — | Th | Th | 1 | 0 | 1 | 1 |
| IV-9 | IV | C7 | C7 | H | F8 | Th | — | Th | Be | 2 | 0 | 2 | 1 |
| IV-10 | IV | C4 | C4 | F4 | H | Th | — | Th | Be | 1 | 0 | 1 | 1 |
| IV-11 | IV | C8 | C8 | F12 | H | Th | — | Th | Be | 1 | 0 | 1 | 3 |
| IV-12 | IV | C6 | C6 | F8 | H | — | — | — | Be | 0 | 0 | 0 | 1 |
| IV-13 | IV | C9 | C9 | H | F6 | Th | — | Th | Be | 10 | 0 | 10 | 1 |
| IV-14 | IV | C10 | C10 | H | C3F10 | Th | — | Th | Be | 1 | 0 | 1 | 1 |
| IV-15 | IV | C14 | C14 | H | F8 | Th | — | Th | Be | 1 | 0 | 1 | 1 |
| IV-16 | IV | C2 | H | F3 | H | Be | — | Be | Th | 1 | 0 | 1 | 1 |
| IV-17 | IV | C3 | C3 | F6 | H | Be | — | Be | Th | 1 | 0 | 1 | 1 |
| IV-18 | IV | C4 | C4 | F10 | H | Be | — | Be | Th | 6 | 0 | 6 | 1 |
| IV-19 | IV | C5 | C5 | F6 | H | Be | — | Be | Th | 1 | 0 | 1 | 1 |
| IV-20 | IV | C6 | C6 | H | F3 | Be | — | Be | Th | 1 | 0 | 1 | 7 |
| IV-21 | IV | C6 | C6 | F5 | H | Be | — | Be | Th | 1 | 0 | 1 | 1 |
| IV-22 | IV | C6 | C6 | C6F8 | H | — | — | — | Th | 0 | 0 | 0 | 5 |
| IV-23 | IV | C6 | C6 | F8 | H | Be | — | Be | Th | 1 | 0 | 1 | 1 |
| IV-24 | IV | C7 | C7 | H | F8 | Be | — | Be | Be | 1 | 0 | 1 | 1 |
| IV-25 | IV | C8 | C8 | H | F9 | Be | — | Be | Be | 1 | 0 | 1 | 1 |
| IV-26 | IV | H | C8 | F12 | H | Be | — | Be | Be | 1 | 0 | 1 | 9 |
| IV-27 | IV | C8 | C8 | H | F12 | Be | — | Be | Be | 4 | 0 | 4 | 1 |
| IV-28 | IV | C9 | C9 | H | F6 | Be | — | Be | Be | 1 | 0 | 1 | 1 |
| IV-29 | IV | C10 | C10 | H | F7 | Be | Be | Be | Be | 1 | 2 | 1 | 1 |
| IV-30 | IV | C14 | C14 | H | F8 | Be | — | Be | Be | 1 | 0 | 1 | 1 |
| IV-31 | IV | C6 | C6 | F6 | F6 | Be | — | Be | Pe | 1 | 0 | 1 | 1 |
| IV-32 | IV | C6 | C6 | F6 | F6 | Be | — | Be | Py | 1 | 0 | 1 | 1 |
| IV-33 | IV | C6 | C6 | F6 | F6 | Th | — | Th | Th | 1 | 0 | 1 | 1 |
| IV-34 | IV | H | C6 | C3F6 | C3F6 | Th | — | Th | Th | 1 | 0 | 1 | 1 |
| IV-35 | IV | C6 | C6 | C4F8 | C4F8 | Th | — | Th | Be | 1 | 0 | 1 | 1 |
| IV-36 | IV | C4 | C4 | F4 | H | — | — | — | Th | 0 | 0 | 0 | 1 |
| IV-37 | IV | OC6 | OC6 | F5 | H | — | — | — | Th | 0 | 0 | 0 | 1 |
| IV-38 | IV | C6 | C6 | F6 | H | — | Th | — | Th | 0 | 4 | 0 | 1 |

TABLE 3

| No. | General Formula | R1 | R2 | R3 | R4 | A1 | A2 | A3 | A4 | X | P | Z | L |
|---|---|---|---|---|---|---|---|---|---|---|---|---|---|
| V-1 | V | C1 | H | F3 | F3 | Th | Th | Th | Th | 1 | 1 | 1 | 1 |
| V-2 | V | C3 | H | F6 | F6 | Th | Be | Th | Th | 1 | 1 | 1 | 1 |
| V-3 | V | C4 | H | F10 | F10 | Th | Th | Th | Th | 2 | 1 | 2 | 1 |
| V-4 | V | C5 | H | H | F6 | Th | Be | Th | Th | 1 | 1 | 1 | 1 |
| V-5 | V | C6 | H | F6 | F6 | Th | Th | Th | Th | 1 | 1 | 1 | 1 |
| V-6 | V | C8 | H | C3F6 | H | Th | Be | Th | Th | 1 | 3 | 1 | 1 |
| V-7 | V | C20 | H | F6 | F6 | Th | Th | Th | Th | 1 | 1 | 1 | 1 |
| V-8 | V | H | C6 | H | F6 | Th | Be | Th | Th | 1 | 1 | 1 | 1 |
| V-9 | V | H | C7 | F8 | F8 | Th | Th | Th | Be | 1 | 1 | 1 | 1 |
| V-10 | V | H | C8 | H | F9 | Th | Be | Th | Be | 1 | 1 | 1 | 1 |
| V-11 | V | H | C9 | F12 | F12 | Th | Th | Th | Be | 1 | 1 | 1 | 1 |
| V-12 | V | H | C18 | C5F12 | H | Th | Be | Th | Be | 1 | 5 | 1 | 1 |
| V-13 | V | C6 | C6 | F6 | F6 | Th | Th | Th | Be | 1 | 1 | 1 | 1 |
| V-14 | V | C7 | C7 | C4F7 | C4F7 | Th | Be | Th | Be | 1 | 1 | 1 | 1 |
| V-15 | V | C8 | C8 | F8 | F8 | Th | Th | Th | Be | 1 | 3 | 1 | 1 |
| V-16 | V | C2 | H | F3 | F3 | Be | Be | Be | Th | 1 | 3 | 1 | 1 |
| V-17 | V | C3 | H | F6 | F6 | Be | Th | Be | Th | 3 | 1 | 3 | 1 |
| V-18 | V | C4 | H | F10 | F10 | Be | Be | Be | Th | 1 | 1 | 1 | 1 |
| V-19 | V | C5 | H | F6 | F6 | Be | Th | Be | Th | 1 | 1 | 1 | 11 |
| V-20 | V | C6 | H | F6 | F6 | Be | Be | Be | Th | 1 | 1 | 1 | 1 |
| V-21 | V | C7 | H | F6 | F6 | Be | Th | Be | Th | 1 | 15 | 1 | 1 |
| V-22 | V | C8 | H | F6 | F6 | Be | Be | Be | Th | 1 | 1 | 1 | 1 |
| V-23 | V | H | C6 | F6 | F6 | Be | Th | Be | Th | 4 | 1 | 4 | 1 |
| V-24 | V | H | C7 | F8 | F8 | Be | Be | Be | Be | 1 | 1 | 1 | 1 |
| V-25 | V | H | C8 | F9 | F9 | Be | Th | Be | Be | 1 | 3 | 1 | 19 |
| V-26 | V | H | C9 | F12 | F12 | Be | Be | Be | Be | 1 | 3 | 1 | 1 |

TABLE 3-continued

| No. | General Formula | R1 | R2 | R3 | R4 | A1 | A2 | A3 | A4 | X | P | Z | L |
|---|---|---|---|---|---|---|---|---|---|---|---|---|---|
| V-27 | V | H | C10 | F12 | F12 | Be | Th | Be | Be | 1 | 1 | 1 | 1 |
| V-28 | V | C6 | C6 | F6 | F6 | Be | Be | Be | Be | 1 | 1 | 1 | 1 |
| V-29 | V | C7 | C7 | F7 | F7 | Be | Th | Be | Be | 1 | 1 | 1 | 1 |
| V-30 | V | C8 | C8 | F8 | F8 | Be | Be | Be | Be | 1 | 1 | 1 | 1 |
| V-31 | V | C6 | C6 | H | F6 | Be | Be | Be | Be | 1 | 1 | 1 | 1 |
| V-32 | V | H | C6 | F6 | F6 | — | Th | — | Be | 0 | 1 | 0 | 1 |
| V-33 | V | C6 | C6 | F6 | H | — | Th | — | Be | 0 | 3 | 0 | 1 |
| V-34 | V | C6 | H | F6 | F6 | — | Th | — | Be | 0 | 5 | 0 | 1 |
| V-35 | V | C6 | C6 | H | F6 | — | Th | — | Be | 0 | 1 | 0 | 3 |

TABLE 4

| No. | General Formula | R1 | R2 | R3 | R4 | A1 | A2 | A3 | A4 | X | P | Z | L |
|---|---|---|---|---|---|---|---|---|---|---|---|---|---|
| VI-1 | VI | C2 | C2 | F3 | H | Th | Th | Th | Th | 1 | 13 | 1 | 1 |
| VI-2 | VI | C3 | C3 | F6 | H | Th | Be | Th | Th | 1 | 1 | 1 | 1 |
| VI-3 | VI | H | C4 | F10 | H | Th | Th | Th | Th | 1 | 1 | 1 | 1 |
| VI-4 | VI | C5 | C5 | F6 | H | Th | Be | Th | Th | 1 | 3 | 1 | 1 |
| VI-5 | VI | C6 | C6 | H | F3 | Th | Th | Th | Th | 1 | 1 | 1 | 1 |
| VI-6 | VI | C6 | C6 | F5 | H | Th | Be | Th | Th | 1 | 1 | 1 | 1 |
| VI-7 | VI | C6 | C6 | F8 | H | — | Th | — | Be | 0 | 1 | 0 | 1 |
| VI-8 | VI | H | C6 | F8 | H | Th | Be | Th | Th | 1 | 1 | 1 | 1 |
| VI-9 | VI | C7 | C7 | H | F8 | Th | Th | Th | Be | 1 | 9 | 1 | 1 |
| VI-10 | VI | C8 | C8 | H | F9 | Th | Be | Th | Be | 12 | 1 | 12 | 1 |
| VI-11 | VI | C8 | H | F12 | H | Th | Th | Th | Be | 1 | 1 | 1 | 1 |
| VI-12 | VI | C8 | C8 | H | C3F12 | Th | Be | Th | Be | 1 | 1 | 1 | 1 |
| VI-13 | VI | C9 | C9 | H | F6 | Th | Th | Th | Be | 1 | 1 | 1 | 1 |
| VI-14 | VI | C10 | C10 | F8 | H | — | Th | — | Th | 0 | 1 | 0 | 1 |
| VI-15 | VI | C14 | H | H | F8 | Th | Th | Th | Be | 1 | 19 | 1 | 1 |
| VI-16 | VI | C2 | C2 | F3 | H | Be | Be | Be | Th | 1 | 1 | 1 | 1 |
| VI-17 | VI | C3 | C3 | F6 | H | Be | Th | Be | Th | 1 | 1 | 1 | 1 |
| VI-18 | VI | C4 | C4 | C2F10 | H | Be | Be | Be | Th | 1 | 3 | 1 | 1 |
| VI-19 | VI | H | C5 | F6 | H | Be | Th | Be | Th | 1 | 3 | 1 | 1 |
| VI-20 | VI | C6 | C6 | H | F3 | Be | Be | Be | Th | 1 | 3 | 1 | 1 |
| VI-21 | VI | C6 | C6 | F5 | H | Be | Th | Be | Th | 1 | 1 | 1 | 1 |
| VI-22 | VI | C6 | C6 | F6 | H | Be | Be | Be | Th | 1 | 3 | 1 | 1 |
| VI-23 | VI | C6 | H | F8 | H | Be | Th | Be | Th | 8 | 1 | 8 | 1 |
| VI-24 | VI | C7 | C7 | H | F8 | Be | Be | Be | Be | 1 | 1 | 1 | 1 |
| VI-25 | VI | C8 | C8 | H | F9 | Be | Th | Be | Be | 1 | 1 | 1 | 1 |
| VI-26 | VI | C8 | C8 | F12 | H | Be | Be | Be | Be | 1 | 1 | 1 | 1 |
| VI-27 | VI | C8 | C8 | H | F12 | Be | Th | Be | Be | 1 | 1 | 1 | 1 |
| VI-28 | VI | C9 | C9 | H | F6 | Be | Be | Be | Be | 1 | 1 | 1 | 1 |
| VI-29 | VI | C10 | C10 | H | F20 | Be | Th | Be | Be | 1 | 1 | 1 | 1 |
| VI-30 | VI | C20 | H | H | F8 | Be | Be | Be | Be | 1 | 1 | 1 | 1 |
| VI-31 | VI | C6 | C6 | F6 | F6 | — | Th | — | Be | 0 | 1 | 0 | 1 |
| VI-32 | VI | C6 | C6 | C2F9 | C2F9 | — | Be | — | Be | 0 | 5 | 0 | 1 |
| VI-33 | VI | C6 | C6 | H | F6 | — | Th | — | Be | 0 | 1 | 0 | 1 |
| VI-34 | VI | H | C6 | F6 | F6 | — | Al2 | — | Th | 0 | 1 | 0 | 1 |
| VI-35 | VI | C6 | C6 | F6 | F6 | — | Ac1 | — | Th | 0 | 1 | 0 | 1 |
| VI-36 | VI | C6 | C6 | F4 | H | — | Th | — | Th | 0 | 1 | 0 | 3 |
| VI-37 | VI | C6 | C6 | F5 | H | — | Th | — | Be | 0 | 1 | 0 | 1 |
| VI-38 | VI | C8 | C8 | F6 | H | — | Th | — | Th | 0 | 1 | 0 | 5 |

TABLE 5

| No. | General Formula | R1 | R2 | R3 | R4 | A2 | Y |
|---|---|---|---|---|---|---|---|
| VII-1 | VII | H | C6 | H | F6 | Th | 2 |
| VII-2 | VII | H | C10 | H | F10 | Be | 4 |
| VII-3 | VII | H | C12 | H | F6 | Th | 2 |
| VII-4 | VII | C8 | H | F6 | H | Be | 2 |
| VII-5 | VII | C12 | H | H | F4 | Th | 2 |
| VII-6 | VII | C6 | H | F7 | H | Be | 2 |
| VII-7 | VII | C6 | C6 | F8 | H | Th | 4 |
| VII-8 | VII | H | C6 | F8 | H | Be | 6 |
| VII-9 | VII | C7 | C7 | H | F8 | Th | 2 |
| VII-10 | VII | H | C12 | H | OC3F4 | Th | 2 |

A general process for processing the π-conjugated compound is explained by reference to Exemplifying compounds (IV-8), (IV-12), and (VI-7) without limiting the production process of the present invention.

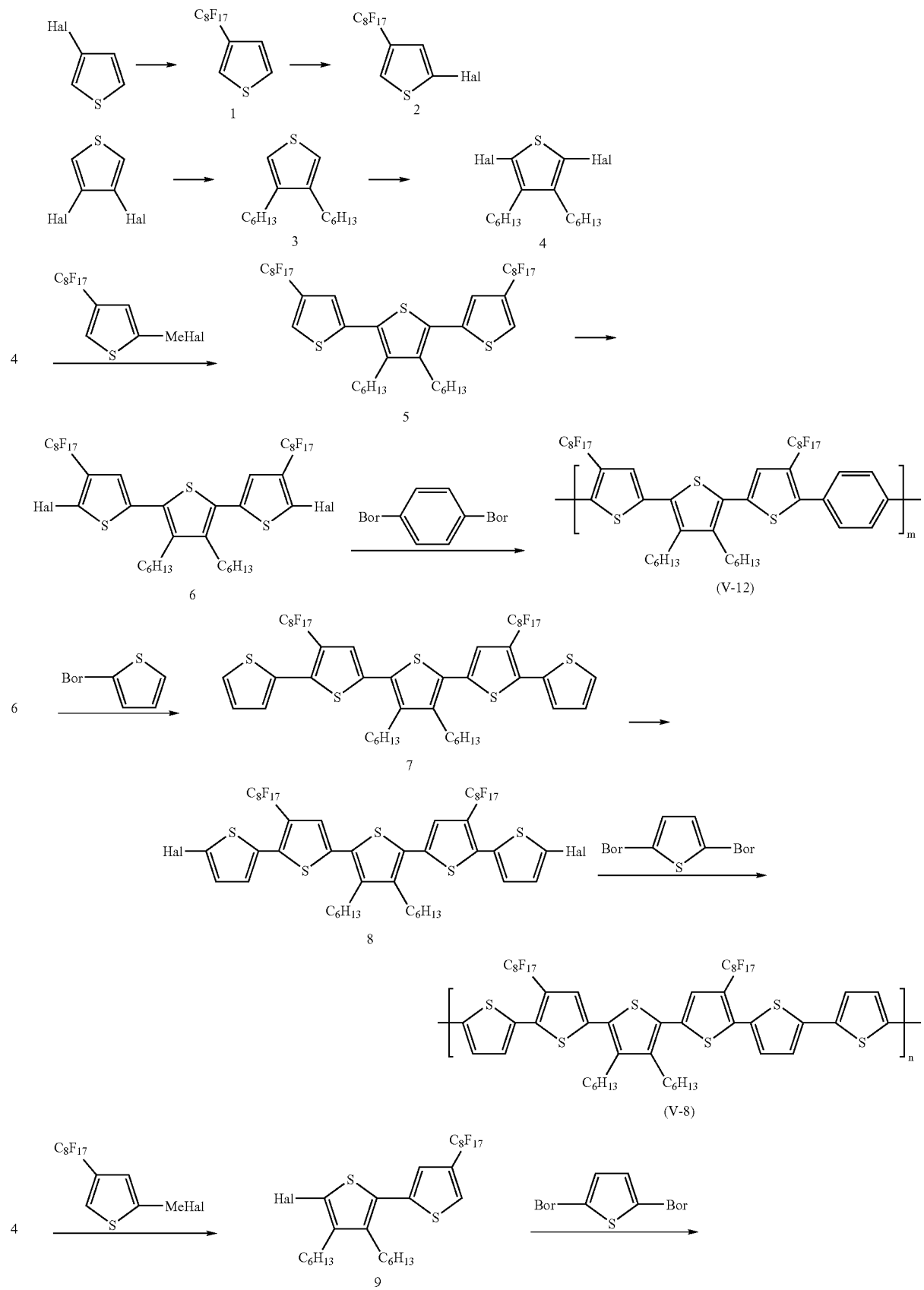

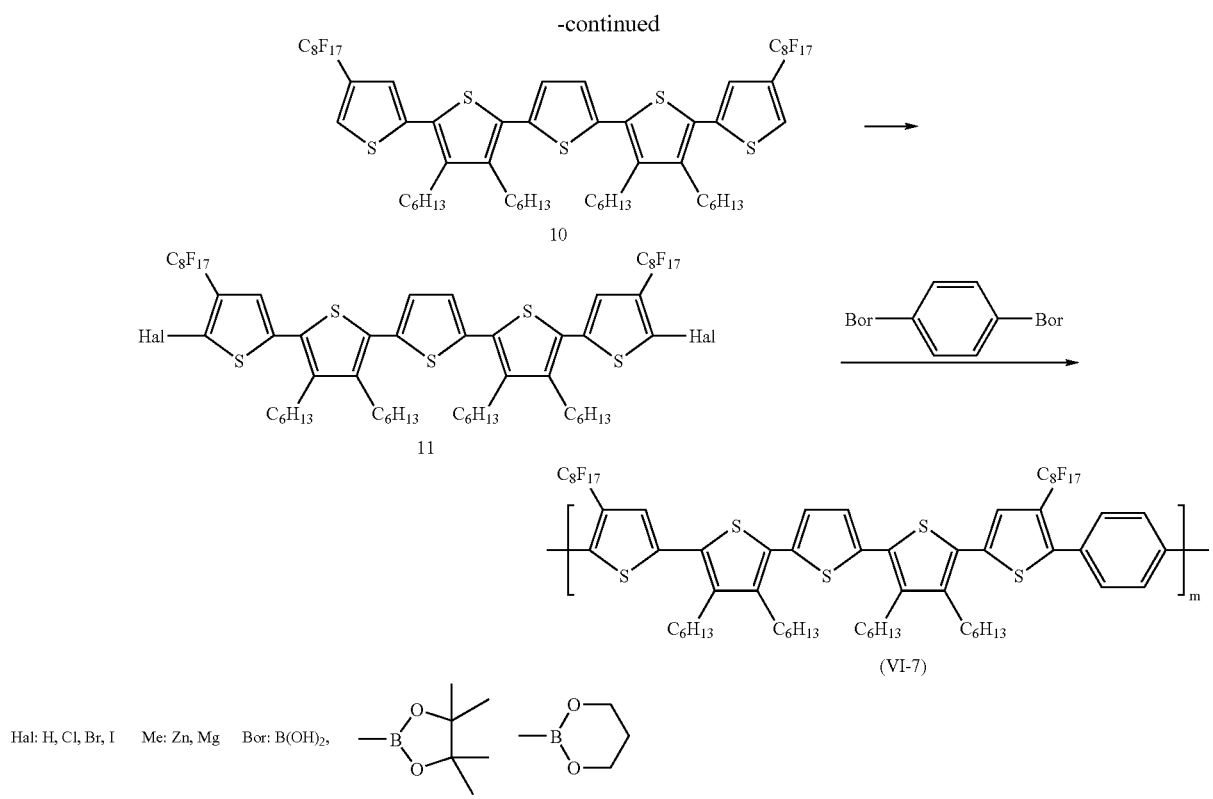

Firstly, 3-halogenothiophene and perfluoroctyl iodide are allowed to react with each other to obtain Compound 1 (References: (1) J. Org. Chem. 1997, 62, 7128; (2) J. Fluorine Chem., 1985, 27, 291). Then the position 2 of the compound is halogenated to obtain Compound 2 (Reference: J. Org. Chem. 1968, 33, 2902). Separately, 3,4-dihalogenothiophene is allowed to react with two equivalents of hexylmagnesium bromide to obtain Compound 3 (Reference: Tetrahedron 1982, 38, 22, 3347). Then this compound is halogenated at positions 2 and 3 to obtain Compound 4 (References: (1) Bull. Chem. Soc. Jpn, 1991, 64, 2566; (2) Chem. Mater. 1994, 6, 401). After Compound 2 is allowed to react with magnesium or zinc to obtain a metal halide, two equivalents of this halide is allowed to react with Compound 4 to obtain Compound 5. This Compound 5 is halogenated in the same manner as in the preparation of Compound 4 to obtain Compound 6 (References: (1) J. Am. Chem. Soc., 1995, 117, 233; (2) Chem. Mater. 1994, 6, 401). With this compound, 1,4-phenylene-bis-boric acid or a derivative thereof is allowed to react to obtain a π-conjugated compound (IV-12) of the present invention.

Separately, Compound 6 is allowed to react with 2-thiophene-boric acid or a derivative thereof to prepare Compound 7, which is halogenated to prepare a dihalide 8. The dihalide 8 is allowed to react with 2,5-thiophene-diboric acid or a derivative thereof to obtain a π-conjugated compound (IV-8) of the present invention.

Separately, a metal halide derived from Compound 2 is allowed to react with an equivalent amount of Compound 4 to prepare Compound 9. This Compound 9 is allowed to react with 2,5-thiophene-diboric acid or a derivative thereof to obtain Compound 10. This compound is halogenated to obtain the dihalide 11. The dihalide is allowed to react with 1,4-phenylene-bis-boric acid or a derivative thereof to obtain a π-conjugated compound (VI-7) of the present invention.

The halogenating agent useful in the above reactions includes iodine, bromine, N-bromosuccinimide, benzyltrimethylammonium tetrachloroiodide, benzyltrimethylammonium tribromide, benzyltrimethylammonium dichloro-iodide, and so forth.

The conductive organic thin film of the present invention contains preferably the aforementioned π-conjugated compound, and preferably the thin film is oriented. The method for the alignment includes rubbing methods, temperature-gradiation methods, frictional transfer methods, and application of a magnetic field or an electric field.

The conductive organic thin film of the present invention may contain a suitable dopant for adjustment of the electric conductivity thereof. The dopant includes acceptors such as $I_2$, $Br_2$, $Cl_2$, ICl, $BF_3$, $PF_5$, $H_2SO_4$, $FeCl_3$, and TCNQ (tetracyanoquinodimethane); donors such as Li, K, Na, Eu; and surfactants such as alkyl sulfonate salts, and alkylbenzene sulfonate salts.

The method of formation of the conductive organic thin film of the present invention is not limited, and includes electrolytic polymerization methods, casting methods, spin-coating methods, immersion coating methods, screen printing methods, micro-molding methods, micro-contact methods, roll application methods, ink-jet methods, and LB methods. The organic thin film can be patterned in an intended shape by photolithography and etching, soft lithography, an ink-jet method, or a like method.

Figure 5:
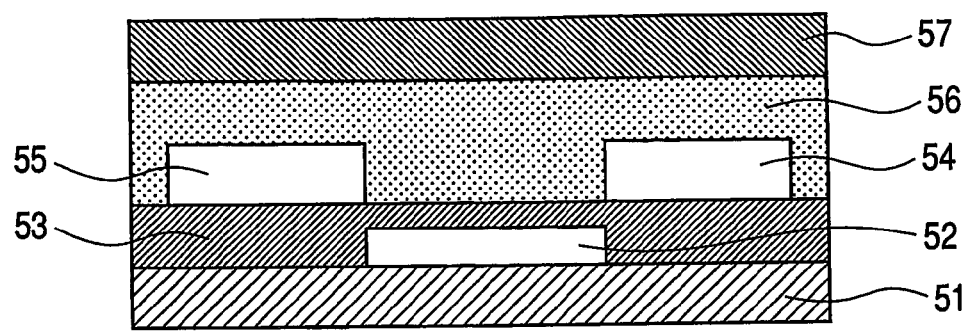
FIG. 5 is a schematic sectional view of a field effect type organic transistor of the present invention.

The present invention relates also to a field effect type organic transistor employing the aforementioned π-conjugated compound or the aforementioned conductive organic thin film. The field effect type organic transistor of the present invention may have a structure of a planar type, a stagger type, or an inversed stagger type. The structure of a field effect type organic transistor of the present invention is explained by reference to a planar type thereof shown in FIG. 5. FIG. 5 is a schematic sectional view of a field-effect type organic transistor of the present invention. In FIG. 5, the field-effect type organic transistor of the present invention is constituted of insulating substrate 51, gate electrode 52 placed thereon, gate insulating layer 53 placed thereon, source electrode 54 and drain electrode 55 placed thereon, organic semiconductor layer 56 placed thereon; and protection layer 57 as the outermost layer.

The material of the gate insulation layer is not limited specially, and includes inorganic materials such as $SiO_2$, SiN, $Al_2O_3$, and $Ta_2O_5$; organic materials such as polyimide, polyacrylonitrile, polytetrafloroethylene, polyvinyl alcohol, polyvinylphenol, polyethylene terephthalate, and polyvinylidene fluoride; and organic-inorganic hybrid materials. These materials may be laminated in two or more layers. This lamination is effective to increase the dielectric strength. Of the materials, organic compounds are preferred since the organic materials can be formed into a film by a low-cost liquid phase process.

The material of the insulating substrate is not specially limited, and includes inorganic materials such as glass, and quartz; photosensitive polymer materials such as of acrylic type, vinyl type, ester type, imide type, urethane type, diazo type, and cinnamoyl type; organic materials such as polyvinylidene fluoride, polyethylene terephthalate, and polyethylene; and organic-inorganic hybrid materials.

Any electroconductive material may be used for the gate electrode, the source electrode, and the drain electrode, provided that the material is electroconductive. The material includes metallic materials such as Al, Cu, Ti, Au, Pt, Ag, and Cr; inorganic materials such as polysilicon, silicides, ITO (indium-tin oxide), and $SnO_2$; highly doped electroconductive polymers such as polypyridine, polyacetylene, polyaniline, polypyrrol, and polythiophene; and electroconductive ink containing carbon particles, silver particles, or the like dispersed therein. In particular, for use for flexible electronic paper sheets or the like, the electrodes are preferably formed from an electroconductive polymer, an electroconductive ink containing carbon particles or silver particles dispersed therein, or the like because of the ease for adjusting the thermal expansion to be equal to that of the substrate.

The methods of forming the electrodes and the gate insulation layer are not specially limited. For the formation with an organic material, the method includes electrolytic polymerization methods, casting methods, spin-coating methods, immersion coating method, screen printing methods, micromolding methods, micro-contact methods, roll application methods, ink-jet methods, and LB methods. Depending on the material, effective method for the formation includes vacuum vapor deposition, CVD, electron beam vapor deposition, resistance-heating vapor deposition, and sputtering.

These electrodes and films can be patterned in an intended design by photolithography and etching treatment. Soft lithography, and an ink-jet method are effective in the patterning. An extraction electrode for the respective electrodes and a protection layer may be formed, as necessary,

INDUSTRIAL AVAILABILITY

The present invention is applicable to electronic devices, particularly to field effect type organic transistors, having a conductive organic thin film useful in electronic fields such as display devices, information tags, and ICs.

EXAMPLE 1

Preparation of Exemplifying Compound (IV-36)

(1) Preparation of 3,4-Dibutylthiphene

Butylmagnesium bromide (140 mmol) was added dropwise at 0° C. to a mixture solution of 3,4-dibromothiophene (50 mmol) and [1,3-bis (diphenylphosphino)propane]dichloronickel(II) (0.3 mmol) in 100 mL of dry diethyl ether. The resulting mixture was heated and refluxed for 6 hours. The reaction mixture was combined with water, and extracted with diethyl ether. The extract solution was derived over magnesium sulfate, and the solvent was evaporated therefrom to obtain a crude product. The crude product was purified by silica gel column chromatography and by distillation to obtain the intended product (32 mmol) in a 64% yield.

(2) Preparation of 2,5-Dibromo-3,4-Dibutylthiophene

Bromine (67 mmol) was added dropwise to a solution of 3,4-dibutylthiophene (30 mmol) in a mixture of 25 mL of glacial acetic acid and 10 mL of dichloromethane at room temperature, and the mixture was stirred for two hours. The resulting reaction mixture was combined with water, and extracted with diethyl ether. The extract solution was dried over magnesium sulfate, and the solvent was evaporated therefrom to obtain a crude product. The crude product was purified by silica gel column chromatography to obtain the intended product (27 mmol) in a 90% yield.

(3) Preparation of 3-Perfluorobutylthiophene

3-Iodothiophene (50 mmol) and perfluorobutyl iodide (60 mmol) were added to a mixture of copper powder (0.16 mmol) and 60 mL of N,N-dimethylformamide. The resulting mixture was stirred in a nitrogen atmosphere at 130° C. for 24 hours. The reaction mixture was filtered to remove the solid matter. The filtrate was mixed with 3N-hydrochloric acid, and was extracted with hexane. The extract solution was washed with a sodium thiosulfate solution, and dried over magnesium sulfate. The solvent was evaporated therefrom to obtain a crude product. The crude product was purified by distillation to obtain the intended product (31 mmol) in a 62% yield.

(4) Preparation of 2-Bromo-4-Perfluorobutylthiophene

A solution of 3-perfluorobutylthiophene (30 mol) and N-bromosuccinimide (33 mmol) in a mixture of 25 mL of chloroform and 25 mL of acetic acid was stirred at room temperature for 5 minutes. The reaction mixture was combined with water, and extracted with chloroform. The extract solution was washed with an aqueous 10% potassium hydroxide solution, and water successively, and dried over magnesium sulfate. The solvent was evaporated to obtain a crude product. The crude product was purified by distillation to obtain the intended product (26 mmol) in an 87% yield.

(5) Preparation of 3', 4'-Dibutyl-4,4"-Diperfluorobutyl-[2,2'; 5', 2"]terthiophene On an ice bath, 1.0 g of magnesium was placed in dry diethyl ether. Thereto was added dropwise a liquid mixture of 2-bromo-4-perfluorobutylthiophene (25 mmol) and 20 mL of dry diethyl ether. Thereto was added 80 mL of dry diethyl ether. The mixture was refluxed for one hour to obtain a Grignard reagent. On a dry ice/acetone bath, the above-prepared Grignard reagent was added through a syringe dropwise into a solution of 2,5-dibromo-3,4-dibutylethiophene (10 mmol) and [1,3-bis(diphenylphosphino)ferrocene] dichloropalladium (50 mg) in 100 mL of dry diethyl ether. The resulting mixture was stirred at room temperature for three days. The reaction mixture was combined with water, and was extracted with diethyl ether. The extract solution was washed with water, and dried over magnesiums sulfate. The solvent was evaporated therefrom to obtain a crude product. The crude product was purified by column chromatography to obtain the intended product (7.2 mmol) at a 72% yield.

(6) Preparation of 5,5"-Dibromo-3',4'-Dibutyl-4,4"-Diperfluorobutyl-[2,2';5',2"]terthiophene A solution of 3',4'-dibutyl-4,4"-diperfluorobutyl-[2,2';5',2"]terthiophene (5 mmol) and N-bromosuccinimide (12 mmol) in a mixture of 15 mL of chloroform and 15 mL of acetic acid was stirred at room temperature for 5 minutes. The reaction mixture was combined with water, and extracted with chloroform. The extract solution was washed with an aqueous 10% potassium hydroxide solution, and water successively, and dried over magnesium sulfate. The solvent was evaporated to obtain a crude product. The crude product was purified by distillation to obtain the intended product (4.2 mmol) in an 84% yield.

(7) Preparation of Exemplifying compound (IV-36)

Tetrakis(triphenylphosphine)palladium (0.04 mmol) and 3 mL of an aqueous 2N sodium carbonate solution were added to a mixture solution of 5,5"-dibromo-3',4'-dibutyl-4,4"-diperfluorobutyl-[2,2';5',2"]terthiophene (2.0 mmol) and 2,5-thiophene-diboric acid (2.0 mmol) in 10 mL of benzene in a nitrogen atmosphere. The resulting mixture was refluxed for 24 hours. The reaction mixture was poured into a large amount of acetone to obtain a crude product. The crude product was purified by repeated reprecipitation to obtain the intended Exemplifying compound (IV-36) in a 45% yield. The obtained Exemplifying compound (IV-36) had a molecular weight of Mn: 23,400; Mw: 32,800 according to GPC measurement (solvent: chloroform).

EXAMPLE 2

Preparation of Exemplifying Compound (IV-10)

(1) Preparation of 3",4"-Dibutyl-3',4'"-Diperfluorobutyl-[2,2';5',2";5",2'";5'",2""]-quinquethiophene Tetrakis(triphenylphosphine)palladium (0.04 mmol) and 3 mL of an aqueous 2N sodium carbonate were added to a mixture solution of 5,5"-dibromo-3',4'-dibutyl-4,4"-diperfluorobutyl-[2,2';5',2"]-terthiophene (2 mmol) and 2-thiophene-boric acid (4 mmol) in 10 mL of benzene in nitrogen atmosphere. The resulting mixture was refluxed for 24 hours. The reaction mixture was combined with water, and extracted with chloroform. The extract solution was washed with water, and dried over magnesium sulfate. The solvent was evaporated to obtain a crude product. The crude product was purified by column chromatography to obtain the intended product (1.6 mmol) in an 80% yield.

(2) preparation of 5,5""-Dibromo-3",4"-Dibutyl-3',4'"-Diperfluorobutyl-[2,2';5',2";5",2'";5'",2""]-quinquethiophene A liquid mixture of 3",4"-dibutyl-3',4'"-diperfluorobutyl-[2,2';5',2";5",2'";5'",2""]-quinquethiophene (1.5 mmol), N-bromosuccinimide (3.5 mmol), 15 mL of chloroform, and 15 mL of acetic acid was stirred at room temperature for 5 minutes. The reaction mixture was combined with water, and was extracted with chloroform. The extract solution was washed with an aqueous 10% potassium hydroxide solution, and water successively, and dried over magnesium sulfate. The solvent was evaporated to obtain a crude product. The crude product was purified by distillation to obtain the intended product (1.2 mmol) in an 80% yield.

(3) Preparation of Exemplifying compound (IV-10)

Tetrakis(triphenylphosphine)palladium (0.02 mmol) and 3 mL of an aqueous 2N sodium carbonate solution were added to a mixture liquid of 5,5""-Dibromo-3",4"-Dibutyl-3',4'"-Diperfluorobutyl-[2,2';5',2";5",2'";5'",2""]quinquethiophene (1.0 mmol), 1,4-phenylene-bisboric acid (1.0 mmol), and 8 mL of benzene in a nitrogen atmosphere. The resulting mixture was refluxed for 24 hours. The reaction mixture was poured into a large amount of acetone to obtain a crude product. The crude product was purified by repeated reprecipitation to obtain the intended Exemplifying compound (IV-10) in a 34% yield. The obtained Exemplifying compound (IV-10) had a molecular weight of Mn: 22,100; Mw: 33,400 according to GPC measurement (solvent: chloroform).

EXAMPLE 3

Preparation of Exemplifying Compound (VI-14)

(1) Preparation of 3,4-Didecylthiphene

Decylmagnesium bromide (140 mmol) was added dropwise at 0° C. to a mixture solution of 3,4-dibromothiophene (50 mmol) and [1,3-bis(diphenylphosphino)propane]dichloronickel(II) (0.3 mmol) in 100 mL of dry diethyl ether. The resulting mixture was heated and refluxed for 6 hours. The reaction mixture was combined with water, and extracted with diethyl ether. The extract solution was dried over magnesium sulfate, and the solvent was evaporated therefrom to obtain a crude product. The crude product was purified by silica gel column chromatography and by distillation to obtain the intended product (38 mmol) in a 76% yield.

(2) Preparation of 2,5-Dibromo-3,4-Didecylthiophene

Bromine (67 mmol) was added dropwise to a solution of 3,4-didecylthiophene (30 mmol) in a mixture of 25 mL of glacial acetic acid and 10 mL of dichloromethane at room temperature, and the resulting mixture was stirred for two hours. The reaction mixture was combined with water, and extracted with diethyl ester. The extract solution was dried over magnesium sulfate, and the solvent was evaporated therefrom to obtain a crude product. The crude product was purified by silica gel column chromatography to obtain the intended product (25 mmol) in an 83% yield.

(3) Preparation of 3-Perfluorooctylthiophene

3-Iodothiophene (50 mmol) and perfluorooctyl iodide (60 mmol) were added to a mixture of copper powder (0.16 mmol) and 60 mL of N,N-dimethylformamide. The resulting mixture was stirred in a nitrogen atmosphere at 130° C. for 24 hours. The reaction mixture was filtered to remove the solid matter. The filtrate was combined with 3N-hydrochloric acid, and was extracted with hexane. The extract solution was washed with a sodium thiosulfate solution, and dried over magnesium sulfate. The solvent was evaporated therefrom to obtain a crude product. The crude product was purified by distillation to obtain the intended product (30 mmol) in a 60% yield.

(4) 2-Bromo-4-Perfluorooctylthiophene

A solution of 3-perfluorooctylthiophene (30 mmol) and N-bromosuccinimide (33 mmol) in a mixture of 25 mL of chloroform and 25 mL of acetic acid was stirred at room temperature for 5 minutes. The reaction mixture was combined with water, and extracted with chloroform. The extract solution was washed with an aqueous 10% potassium hydroxide solution, and water successively, and dried over magnesium sulfate. The solvent was evaporated to obtain a crude product. The crude product was purified by distillation to obtain the intended product (24 mmol) in an 80% yield (5) Preparation of 2-Bromo-3,4-Didecyl-4'-Perfluoroctyl-2, 2'-bithiophene On an ice bath, 1.0 g of magnesium was placed in dry diethyl ether. Thereto was added dropwise a liquid mixture of 2-bromo-4-perfluorooctylthiophene (10 mmol) and 20 mL of dry diethyl ether. Thereto was added 80 mL of dry diethyl ether. The mixture was refluxed for one hour to obtain a Grignard reagent. On a dry ice/acetone bath, the above-prepared Grignard reagent was added through a syringe dropwise into a solution of 2,5-dibromo-3,4-didecylthiophene (10 mmol) and [1,3-bis(diphenylphosphino)ferrocene]-dichloropalladium (50 mg) in 100 mL of dry diethyl ether. The resulting mixture was stirred at room temperature for three days. The reaction mixture was combined with water, and was extracted with diethyl ether. The extract solution was washed with water, and dried over magnesium sulfate. The solvent was evaporated therefrom to obtain a crude product. The crude product was purified by column chromatography to obtain the intended product (5.4 mmol) at a 54% yield.

(6) Preparation of 3',4',3''',4'''-tetradecyl-4,4''''-diperfluorooctyl-[2,2';5',2'';5'',2''';5''',2'''']-quinquethiophene To a mixture solution of 2-bromo-3,4-didecyl-4'-perfluoroctyl-2,2'-bithiophene (5.0 mmol) and 2,5-thiophene-diboric acid (2.5 mmol) in 10 mL of benzene, were added tetrakis (triphenylphosphine)palladium (0.08 mmol) and 6 mL of an aqueous 2N sodium carbonate solution in a nitrogen atmosphere. The resulting mixture was refluxed for 24 hours. The reaction mixture is combined with water and was extracts with chloroform. The extract solution was washed with water, and was dried over magnesium sulfate. The solvent was evaporated to obtain a crude product. The crude product was purified by column chromatography to obtain the intended product (4.1 mmol) at an 82% yield.

(b 7) Preparation of 5,5''''-Dibromo-3',4',3''',4'''-Tetradecyl-4, 4''''-Diperfluorooctyl-[2,2';5',2'';5'',2''';5''',2'''']quinquethiophene A solution of 3',4',3''',4'''-tetradecyl-4,4''''-diperfluorooctyl-[2,2';5',2'';5'',2''';5''',2'''']-quinquethiophene (1.5 mmol) and N-bromosuccinimide (3.5 mmol) in a mixture of 15 mL of chloroform and 15 mL of acetic acid was stirred at room temperature for 5 minutes. The reaction mixture was combined with water, and extracted with chloroform. The extract solution was washed with an aqueous 10% potassium hydroxide solution, and water successively, and dried over magnesium sulfate. The solvent was evaporated to obtain a crude product. The crude product was purified by distillation to obtain the intended product (0.8 mmol) in a 53% yield.

(8) Preparation of Exemplifying compound (VI-14)

Tetrakis(triphenylphosphine) palladium (0.02 mmol) and 2 mL of an aqueous 2N sodium carbonate solution were added to a mixture solution of 5,5''''-dibromo-3',4',3''',4'''-tetradecyl-4,4''''-diperfluorooctyl-[2,2';5',2'';5'',2''';5''',2'''']-quinquethiophene (0.5 mmol) and 2,5-thiophene-diboric acid (0.5 mmol) in 5 mL of benzene in a nitrogen atmosphere. The resulting mixture was refluxed for 24 hours. The reaction mixture was poured into a large amount of acetone to obtain a crude product. The crude product was purified by repeated reprecipitation to obtain the intended Exemplifying compound (VI-14) in a 44% yield. The obtained Exemplifying compound (VI-14) had a molecular weight of Mn: 43,100, Mw: 55,100 according to GPC measurement (solvent: chloroform).

EXAMPLE 4

Figure 6:
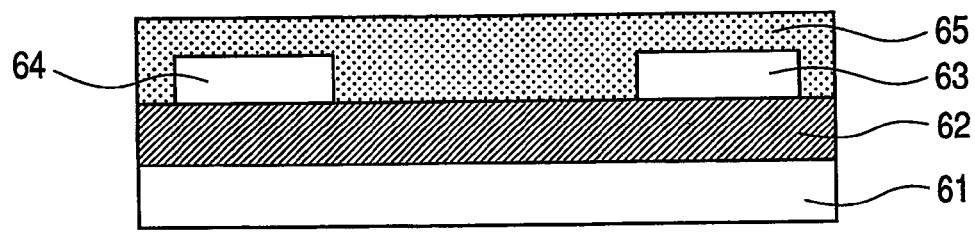
FIG. 6 is a schematic sectional view of a field effect type organic transistor used in Examples.

FIG. 6 is a schematic sectional view of the field effect type organic transistor of this Example. Gate electrode 61 was a highly doped n-type silicon substrate. Gate insulating layer 62 was formed from $SiO_2$. Source electrode 63 and drain electrode 64 were formed from gold. Organic semiconductor layer 65 was formed from Exemplifying compound (IV-36) prepared in Example 1. The production process of the transistor is described below.

A thermal oxidation film $SiO_2$ (300 nm) was formed on a silicon substrate. Thereon, a source electrode and a drain electrode of chromium (5 nm)/gold (100 nm) were formed respectively with a channel length 50 μm and a channel breadth 50 mm. Further thereon, organic semiconductor layer 65 was formed by applying a solution of Exemplifying compound (IV-36) in chloroform (0.01 g/mL) by spin coating and drying the applied solution at 120° C. for 12 hours. The gate electrode, the drain electrode and the source electrode were wired respectively with gold wires of 0.1 mm diameter and a silver paste to complete a field effect type organic transistor element.

Next, the drain current was measured in the gate voltage range from 0 V to −50 V and in the range of the voltage between the source and drain electrodes from 0 V to −50 V. The threshold voltage Vth was derived by extrapolating the relation between the square root of the drain current and the gate voltage to drain current Id=0. Further, the carrier mobility μ was calculated according to Formula (i) below:

$$\mu = Id / \{W/2L)Ci(Vg-Vth)^2\} \quad (i)$$

(in the Formula, μ denotes a mobility; Id, a drain current (A); W, a channel breadth (cm); L, a channel length (cm); Ci, a capacity ($F/cm^2$) for a unit area of the gate insulating layer; Vg, a gate voltage (V); and Vth, a threshold voltage (V)).

Further, the on-off ratio was calculated from the ratio of the drain current at the gate voltage of 0 V and the voltage between the source and drain electrodes of −50V (off current) to the drain current at the gate voltage of −50 V and the voltage between the source and drain electrodes of −50V (on current). The calculation results are shown below.

| Mobility | $1.2 \times 10^{-1}$ $cm^2/Vs$ |
| On-off ratio | $1.8 \times 10^6$ |

This element was left standing in the open air at room temperature for three months. Thereafter the same measurement was conducted as above. The change was less than 10%.

COMPARATIVE EXAMPLE 1

Comparative Compound (A) shown below was prepared for comparison with Exemplifying compound (IV-36), a π-conjugated compound of the present invention.

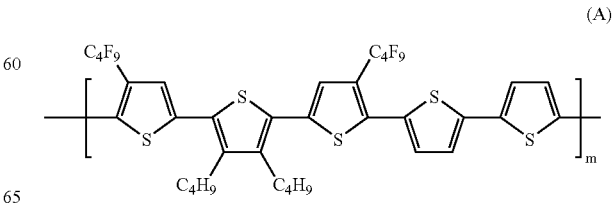

(A)

The preparation process is described below.

Tetrakis(triphenylphosphine)palladium (0.04 mmol) and 3 mL of an aqueous 2N sodium carbonate solution were added to a mixture solution of 5,5''-dibromo-3',4'-dibutyl-4,4''-diperfluorobutyl-[2,2';5',2'']terthiophene (2 mmol) and 2,2'-dithiophene-5,5'-diboric acid (2 mmol) in 10 mL of benzene in a nitrogen atmosphere. The resulting mixture was refluxed for 24 hours. The reaction mixture was poured into a large amount of acetone to obtain a crude product of Comparative Compound (A). This crude product was purified by repeated reprecipitation to obtain the intended Comparative Compound (A) in a 31% yield. The obtained Comparative Compound (A) had a molecular weight of Mn: 19,300; Mw: 31,800 according to GPC measurement (solvent: chloroform).

| Mobility | $8.2 \times 10^{-2}$ cm$^2$/Vs |
|---|---|
| On-off ratio | $5.2 \times 10^5$ |

This element was left standing in the open air at room temperature for three months. Thereafter the same measurement was conducted as above. The change was less than 10%.

COMPARATIVE EXAMPLE 2

Comparative Compound (B) shown below was prepared for comparison with Exemplifying compound (IV-10), a π-conjugated compound of the present invention.

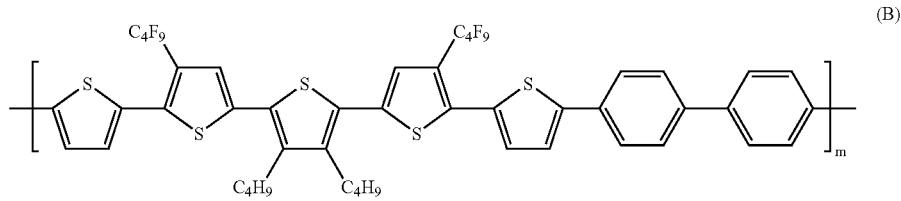

(B)

A field effect type organic transistor was prepared in the same manner as in Example 4 except that Comparative Compound (A) was used in place of Exemplifying compound (IV-36) used in Example 4. The mobility was measured in the same manner as in Example 4. The results are shown below.

| Mobility | $8.2 \times 10^{-3}$ cm$^2$/Vs |
|---|---|
| On-off ratio | $7.4 \times 10^3$ |

EXAMPLE 5

FIG. 6 is a schematic sectional view of the field effect type organic transistor employed in this Example. Gate electrode 61 was a highly doped n-type silicon substrate. Gate insulating layer 62 was formed from polyvinylphenol. Source electrode 63 and drain electrode 64 were formed from gold. Organic semiconductor layer 65 was formed from Exemplifying compound (IV-10) prepared in Example 2. The production process of the transistor is described below.

On a silicon substrate, a gate insulation layer was formed by applying a solution of polyvinylphenol in 2-propanol (0.1 g/mL) by spin coating and drying the applied solution at 150° C. for 6 hours. Thereon, a source electrode and a drain electrode were formed from gold (50 nm) by vapor deposition with a channel length of 50 μm and a channel breadth of 10 mm respectively. Further thereon, organic semiconductor layer 65 was formed by applying a solution of Exemplifying compound (IV-10) in chloroform (0.01 g/mL) by spin coating and drying the applied solution at 120° C. for 12 hours. The gate electrode, the drain electrode, and the source electrode were wired respectively with gold wires of 0.1 mm diameter and a silver paste to complete a field effect type organic transistor element.

The mobility was measured in the same manner as in Example 4. The results are shown below.

The preparation process is described below.

Tetrakis(triphenylphosphine)palladium (0.02 mmol) and 3 mL of an aqueous 2N sodium carbonate solution were added to a mixture liquid of 5,5''''-dibromo-3'',4''-dibutyl-3',4'''-diperfluorobutyl-[2,2';5',2'';5'',2''';5''',2'''']quinquethiophene (1.0 mmol), 4,4'-biphenyl-bisboric acid (1.0 mmol), and 8 mL of benzene in a nitrogen atmosphere. The resulting mixture was refluxed for 24 hours. The reaction mixture was poured into a large amount of acetone to obtain a crude product. This crude product was purified by repeated reprecipitation to obtain the intended Comparative Compound (B) in a 29% yield. The obtained Comparative Compound (B) had a molecular weight of Mn: 21,300; Mw: 30,000 according to GPC measurement (solvent: chloroform).

A field effect type organic transistor was prepared in the same manner as in Example 5 except that Comparative Compound (B) was used in place of Exemplifying compound (IV-10) used in Example 5. The mobility was measured in the same manner as in Example 4. The results are shown below.

| Mobility | $1.5 \times 10^{-3}$ cm$^2$/Vs |
|---|---|
| On-off ratio | $3.7 \times 10^3$ |

EXAMPLE 6

Figure 7:
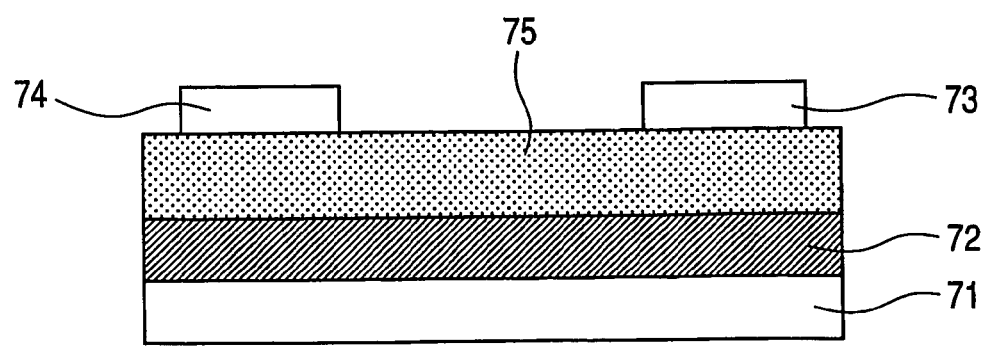
FIG. 7 is a schematic sectional view of a field effect type organic transistor used in Examples.

FIG. 7 is a schematic section view of a field effect type organic transistor employed in this Example. Gate electrode 71 was a highly doped n-type silicon substrate. Gate insulating layer 72 was formed from polyvinylphenol. Source electrode 73 and drain electrode 74 were formed from gold. Organic semiconductor layer 75 was formed from Exemplifying compound (VI-14) prepared in Example 3. The product process of the transistor is described below.

On a silicon substrate, a gate insulation layer was formed by applying a solution of polyvinylphenol in 2-propanol (0.1 g/mL) by spin coating and drying the applied solution at 150° C. for 6 hours. Thereon, organic semiconductor layer 65 was formed by applying a solution of Exemplifying compound (VI-14) in chloroform (0.01 g/mL) by spin coating and drying the applied solution at 120° C. for 12 hours. Further thereon, a source electrode and a drain electrode were formed from gold (50 nm) by vacuum vapor deposition respectively with a channel length of 50 μm and a channel breadth of 10 mn. The gate electrode, the drain electrode and the source electrode were wired respectively with gold wires of 0.1 mm diameter and a silver paste to complete a field effect type organic transistor element.

The mobility was measured in the same manner as in Example 4. The results are shown below.

| Mobility | $1.4 \times 10^{-1}$ cm$^2$/Vs |
|---|---|
| On-off ratio | $2.4 \times 10^6$ |

This element was left standing in the open air at room temperature for three months. Thereafter the same measurement was conducted as above. The change was less than 10%.

COMPARATIVE EXAMPLE 3

Comparative Compound (C) shown below was prepared for comparison with Exemplifying compound (VI-14) a π-conjugated compound of the present invention.

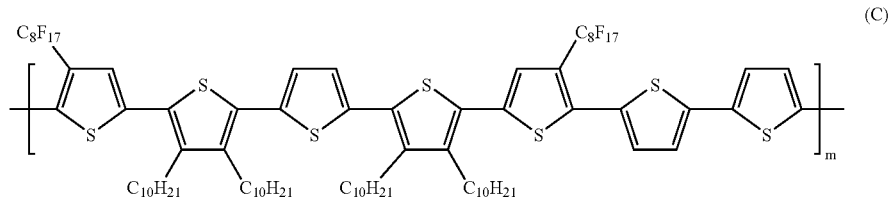

(C)

The preparation process is described below.

Tetrakis(triphenylphosphine)palladium (0.02 mmol) and 2 mL of an aqueous 2N sodium carbonate solution were added to a mixture liquid of 5,5''''-dibromo-3',4',3''',4'''-tetradecyl-4,4''''-diperfluorooctyl-[2,2';5',2'';5'',2''';5''',2'''']-quin-quethiophene (0.5 mmol), 2,2'-dithiophene-5,5'-diboric acid (0.05 mmol), and 5 mL of benzene in a nitrogen atmosphere. The resulting mixture was refluxed for 24 hours. The reaction mixture was poured into a large amount of acetone to obtain a crude product. This crude product was purified by repeated reprecipitation to obtain the intended Comparative Compound (C) in a 28% yield. The obtained Comparative Compound (C) had a molecular weight of Mn: 35,100; Mw: 39,100 according to GPC measurement (solvent: chloroform).

A field effect type organic transistor was prepared in the same manner as in Example 6 except that Comparative Compound (C) was used in place of Exemplifying compound (VI-14) used in Example 6. The mobility was measured in the same manner as in Example 4. The results are shown below.

| Mobility | $9.1 \times 10^{-3}$ cm$^2$/Vs |
|---|---|
| On-off ratio | $7.3 \times 10^3$ |

EXAMPLE 7

FIG. 7 is a schematic sectional view of a field effect type organic transistor employed in this Example. Gate electrode 71 was a highly doped n-type silicon substrate. Gate insulating layer 72 was formed from polyimide. Source electrode 73 and drain electrode 74 were formed from gold. Organic semiconductor layer 75 was formed from Exemplifying compound (VI-14) prepared in Example 3. The production process of the transistor is described below.

On a silicon substrate, a gate insulation layer was formed by applying a polyamic acid by spin coating and baking the applied polyamic acid at 200° C. to form a polyimide film. Thereon, organic semiconductor layer 65 was formed by applying a solution of Exemplifying compound (VI-14) in chloroform (0.01 g/mL) by spin coating and drying the applied solution at 120° C. for 12 hours. The surface of this layer was rubbed with cloth for rubbing treatment. Further thereon, a source electrode and a drain electrode were formed from gold (50 nm) by vacuum vapor deposition respectively with a channel length of 50 μm and a channel breadth of 10 mm. The electrodes were arranged to allow the current to flow parallel to the rubbing direction. The gate electrode, the drain electrode, and the source electrode were wired respectively with gold wires of 0.1 mm diameter and a silver paste to complete a field effect type organic transistor element.

The mobility was measured in the same manner as in Example 4. The results are shown below.

| Mobility | $5.2 \times 10^{-1}$ cm$^2$/Vs |
|---|---|
| On-off ratio | $1.2 \times 10^7$ |

This element was left standing in the open air at room temperature for three months. Thereafter the same measurement was conducted as above. The change was less than 10%.

EXAMPLE 8

FIG. 7 is a schematic sectional view of a field effect type organic transistor employed in this Example. Gate electrode 71 was a highly doped n-type silicon substrate. Gate insulating layer 72 was formed from polyimide. Source electrode 73 and drain electrode 74 were formed from gold. Organic semiconductor layer 75 was formed from Exemplifying compound (VI-14) prepared in Example 3. The production process of the transistor is described below.

On a silicon substrate, a gate insulation layer was formed by applying a polyamic acid by spin coating and baking the applied polyamic acid at 200° C. to form a polyimide film. Thereon, organic semiconductor layer 65 was formed by applying a solution of Exemplifying compound (VI-14) in chloroform (0.01 g/mL) by spin coating and drying the applied solution at 120° C. for 12 hours. The surface of this layer was rubbed with cloth for rubbing treatment. Further thereon, a source electrode and a drain electrode were formed from gold (50 nm) by vacuum vapor deposition respectively with a channel length 50 μm and a channel breadth 10 mm. The electrodes were arranged to allow the current to flow perpendicularly to the rubbing direction. The gate electrode, the drain electrode, and the source electrode were wired respectively with gold wires of 0.1 mm diameter and a silver paste to complete a field effect type organic transistor element.

The mobility was measured in the same manner as in Example 4. The results are shown below.

| Mobility | $1.1 \times 10^{-1}$ cm$^2$/Vs |
|---|---|
| On-off ratio | $2.0 \times 10^6$ |

This element was left standing in the open air at room temperature for three months. Thereafter the same measurement was conducted as above. The change was less than 10%.

By comparison of Example 4 with Comparative Example 1, Example 5 with Comparative Example 2, and Example 6 with Comparative 3, it is clear that the field effect type organic transistor of the present invention has high mobility and a high on-off ratio.

EXAMPLE 9

Preparation of Exemplifying Compound (VII-3)

(1) Preparation of 3,5-Dibromo-2,2'-Bithiophene

Tetrakis(triphenylphosphine)palladium (3 mmol) and 100 mL of an aqueous 2N sodium carbonate solution were added to a solution of 2-thiophene-boric acid (5.0 mmol) and 2,3,5-tribromothiophene (100 mmol) in a mixture of 200 mL of toluene and 100 mL of ethanol in a nitrogen atmosphere. The resulting mixture was refluxed for 24 hours. The reaction mixture was combined with water, and extracted with toluene. The extract solution was washed with water, and dried over magnesium sulfate. The solvent was evaporated to obtain a crude product. The crude product was purified by column chromatography and by recrystallization from hexane to obtain the intended product (22.1 mmol) in a 22% yield.

(2) Preparation of 4'-Bromo-3-Dodecyl-[2,2';5',2"]terthiophene

Tetrakis(triphenylphosphine)palladium (0.1 mmol) and 3 mL of an aqueous 2N sodium carbonate solution were added to a solution of 3-dodecyl-2-thiophene-boric acid (3.1 mmol) and 3,5-dibromo-2,2'-bithiophene (3.1 mmol) in a mixture of 6 mL of toluene and 3 mL of ethanol in a nitrogen atmosphere. The resulting mixture was refluxed for 24 hours. The reaction mixture was combined with water, and extracted with hexane. The extract solution was washed with water, and dried over magnesium sulfate. The solvent was evaporated to obtain a crude product. The crude product was purified by column chromatography to obtain the intended product (2.52 mmol) in an 80% yield.

(3) Preparation of 4'-Perfluorohexyl-3-Dodecyl-[2,2';5',2"] terthiophene

A mixture of perfluorohexyl iodide (2.6 mmol) and copper powder (5.16 mmol) in 3 mL of dry dimethylsulfoxide was stirred at 125° C for 1.5 hours in a nitrogen atmosphere. Thereto was added 4'-bromo-3-dodecyl-[2,2';5',2"]terthiophene (1.29 mmol) in 5 mL of dry dimethylsulfoxide. The resulting mixture was stirred at 120° C. for 6 hours. After the reaction, hexane and water were added to the reaction mixture. The mixture was filtered through Celite, and the filtrate was extracted with hexane. The extract solution was washed with water and dried over magnesium sulfate. Therefrom the solvent was evaporated to obtain a crude product. The crude product was purified by column chromatography to obtain the intended product (0.6 mmol) in a 47% yield.

(4) Preparation of 5,5"-Dibromo-4'-Perfluorohexyl-3-Dodecyl-[2,2';5'2"]terthiophene A solution of 4'-perfluorohexyl-3-dodecyl-[2,2';5',2"]terthiophene (0.26 mmol) and N-bromosuccinimide (0.55 mmol) in a mixture of 2 mL of chloroform and 2 mL of acetic acid was stirred at room temperature for 5 hours. The reaction mixture was combined with water, and extracted with hexane. The extract solution was washed with an aqueous 10% potassium hydroxide solution, and water successively, and dried over magnesium sulfate. The solvent was evaporated to obtain a crude product. The crude product was purified by column chromatography to obtain the intended product (0.23 mmol) in a 90% yield.

(5) Preparation of Exemplifying Compound (VII-3)

Tetrakis(triphenylphosphine)palladium (0.04 mmol) and 3 mL of an aqueous 2N sodium carbonate solution were added to a solution of 5,5"-dibromo-4-perfluorohexyl-3-dodecyl-[2,2';5',2"] terthiophene (2.0 mmol) and 2,5-thiophene-diboric acid (2.0 mmol) in 10 mL of benzene in a nitrogen atmosphere. The resulting mixture was refluxed for 24 hours. The reaction mixture was poured into a large amount of acetone to obtain a crude product. The crude product was purified by repeated reprecipitation to obtain the intended Exemplifying compound (VII-3) in a 35% yield. The obtained Exemplifying compound (VII-3) had a molecular weight of Mn: 13,400; Mw: 22,300 according to GPC measurement (solvent: chloroform).

EXAMPLE 10

Preparation of Exemplifying Compound (VII-10)

Tetrakis(triphenylphosphine)palladium (0.04 mmol) and 3 mL of an aqueous 2N sodium carbonate solution were added to a mixture liquid of 5,5"-dibromo-4'-perfluorobutylpentyloxy-3-dodecyl-[2,2';5'2"]terthiophene (2.0 mmol), 2,5-thiophene-boric acid (2.0 mmol), and 10 mL of benzene in a nitrogen atmosphere. The resulting mixture was refluxed for 24 hours. The reaction mixture was poured into a large amount of acetone to obtain a crude product. The crude product was purified by repeated reprecipitation to obtain the intended Exemplifying compound (VII-10) in a 35% yield. The obtained Exemplifying compound (VII-10) had a molecular weight of Mn: 11,300; Mw: 19,300 according to GPC measurement (solvent: chloroform).

EXAMPLE 11

A field effect type organic transistor was prepared in the same manner as in Example 4 except that Exemplifying compound (VII-3) prepared in Example 9 was used in place of Exemplifying compound (IV-36) used in Example 4. The mobility was measured in the same manner as in Example 4. The results are shown below.

| Mobility | $2.2 \times 10^{-1}$ cm$^2$/Vs |
|---|---|
| On-off ratio | $5.2 \times 10^6$ |

This element was left standing in the open air at room temperature for three months. Thereafter the same measurement was conducted as above. The change was less than 10%.

EXAMPLE 12

A field effect type organic transistor was prepared in the same manner as in Example 4 except that Exemplifying compound (VII-10) prepared in Example 10 was used in place of Exemplifying compound (IV-36) used in Example 4. The mobility was measured in the same manner as in Example 4. The results are shown below.

| | |
|---|---|
| Mobility | $2.7 \times 10^{-1}$ cm$^2$/Vs |
| On-off ratio | $8.2 \times 10^6$ |

This element was left for standing in the open air at room temperature for three months. Thereafter the same measurement was conducted as above. The change was less than 10%.

The invention claimed is:

1. A π-conjugated compound represented by General Formula (VI) below:

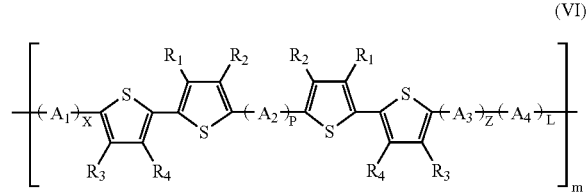

(VI)

where $R_1$ and $R_2$ are respectively hydrogen or a linear, cyclic, or branched alkyl group of 1 to 20 carbon atoms, at least one of $R_1$ and $R_2$ being not hydrogen, and one or more of $CH_2$ of the alkyl group optionally replaced by O, CO, S, or NH; $R_3$ and $R_4$ are respectively hydrogen or a linear, cyclic, or branched perfluoroalkyl group of 1 to 20 carbon atoms, at least one of $R_3$ and $R_4$ being not hydrogen, and one or more $CF_2$ of the perfluoroalkyl group optionally replaced by $CH_2$, O, CO, S, or NH; $A_1$ and $A_3$ each represents a single bond, $A_2$ and $A_4$ each represents a thiophene ring; one or more of CH groups in the ring optionally have a substituent; r is an integer of 1 to 10; X, Z, and L are respectively an integer of 0 to 20 provided that the sum X+Z+L is an odd number; Y is an even number of not more than 20; P is an odd number not more than 19; and m is an integer of 2 to 500.

2. The π-conjugated compound according to claim 1, wherein X, Z, and L are respectively an integer of 0 to 6, Y is an even number of 6 or less, and P is an odd number of 5 or less.

3. The π-conjugated compound according to claim 1, wherein $R_1$ and $R_2$ each represents $C_{10}H_{21}$, $R_3$ represents $C_8F_{17}$, and $R_4$ represents H; $A_2$ and $A_4$ each represents

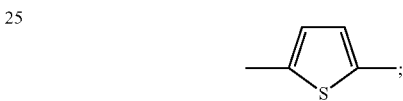

X is 0, P is 1, Z is 0, and L is 1.

4. A conductive organic thin film containing the π-conjugated compound set forth in claim 1.

* * * * *